(12) United States Patent
Vuong et al.

(10) Patent No.: US 9,096,817 B2
(45) Date of Patent: Aug. 4, 2015

(54) COPOLYMER FOR PROCESSING OR MODIFYING SURFACES

(75) Inventors: Chi-Thanh Vuong, Lognes (FR); Olivier Anthony, Meriel (FR); Veronique Geoffroy, Saint-Leu la Foret (FR); Florence Lambert, Paris (FR)

(73) Assignee: RHODIA OPERATIONS, Aubervilliers (FR)

( * ) Notice: Subject to any disclaimer, the term of this patent is extended or adjusted under 35 U.S.C. 154(b) by 0 days.

(21) Appl. No.: 12/741,570

(22) PCT Filed: Oct. 16, 2008

(86) PCT No.: PCT/EP2008/063962
§ 371 (c)(1),
(2), (4) Date: Jul. 13, 2010

(87) PCT Pub. No.: WO2009/059878
PCT Pub. Date: May 14, 2009

(65) Prior Publication Data
US 2010/0273697 A1    Oct. 28, 2010

(30) Foreign Application Priority Data

Nov. 6, 2007 (FR) ..................... 07 07785
Mar. 6, 2008 (FR) ..................... 08 01226

(51) Int. Cl.
| | | |
|---|---|---|
| *C11D 1/94* | (2006.01) | |
| *C11D 3/37* | (2006.01) | |
| *C08F 220/34* | (2006.01) | |
| *C08F 220/60* | (2006.01) | |
| *C08F 226/04* | (2006.01) | |
| *C08F 226/06* | (2006.01) | |
| *C08F 226/10* | (2006.01) | |
| *C11D 3/00* | (2006.01) | |

(52) U.S. Cl.
CPC ............ *C11D 3/3776* (2013.01); *C08F 220/34* (2013.01); *C08F 220/60* (2013.01); *C08F 226/04* (2013.01); *C08F 226/06* (2013.01); *C08F 226/10* (2013.01); *C11D 3/0021* (2013.01); *C11D 3/3723* (2013.01)

(58) Field of Classification Search
CPC ................................ C11D 1/72; C11D 3/0073
USPC ........................................................ 510/220
See application file for complete search history.

(56) References Cited

U.S. PATENT DOCUMENTS

| | | | | |
|---|---|---|---|---|
| 4,368,146 | A * | 1/1983 | Aronson et al. ............. | 134/25.2 |
| 4,728,455 | A | 3/1988 | Rerek | |
| 4,792,400 | A * | 12/1988 | Dougherty et al. ........ | 210/500.1 |
| 5,114,606 | A | 5/1992 | Van Vliet et al. | |
| 5,280,117 | A | 1/1994 | Kerschner et al. | |
| 5,492,988 | A * | 2/1996 | Liu et al. ...................... | 526/264 |
| 5,536,452 | A | 7/1996 | Black | |
| 5,559,261 | A | 9/1996 | Sivik | |
| 5,587,022 | A | 12/1996 | Black | |
| 6,552,525 | B2 | 4/2003 | Bessler | |
| 6,656,900 | B2 | 12/2003 | Sivik et al. | |
| 7,648,952 | B2 * | 1/2010 | Lang ............................. | 510/352 |
| 2004/0149634 | A1 * | 8/2004 | Hughes ........................ | 210/96.1 |
| 2005/0039266 | A1 * | 2/2005 | Kvita et al. .................. | 8/115.51 |
| 2005/0235830 | A1 * | 10/2005 | Hughes .......................... | 96/108 |
| 2007/0054827 | A1 * | 3/2007 | Cheung ........................ | 510/238 |
| 2007/0148101 | A1 * | 6/2007 | Snyder et al. .................... | 424/47 |
| 2007/0277327 | A1 * | 12/2007 | Wessling et al. .................. | 8/137 |
| 2008/0090748 | A1 * | 4/2008 | Lang ............................. | 510/407 |
| 2008/0096788 | A1 * | 4/2008 | Lang ............................. | 510/407 |
| 2008/0105847 | A1 * | 5/2008 | Lang ............................. | 252/8.91 |

FOREIGN PATENT DOCUMENTS

| | | | | |
|---|---|---|---|---|
| DE | 4403409 | A1 | 8/1995 | |
| EP | 0488868 | A2 | 6/1992 | |
| EP | 0561656 | A1 | 9/1993 | |
| EP | 0909809 | A2 | 4/1999 | |
| EP | 1362907 | A2 | 11/2003 | |
| WO | WO 9623859 | | 8/1996 | |
| WO | WO 9623860 | | 8/1996 | |
| WO | WO 9623861 | | 8/1996 | |
| WO | WO 9745510 | A1 * | 12/1997 | ............... C11D 1/02 |
| WO | WO 9836046 | A1 * | 8/1998 | ............... C11D 3/37 |
| WO | WO 9927053 | | 6/1999 | |
| WO | WO 9927054 | | 6/1999 | |
| WO | WO 9927057 | | 6/1999 | |
| WO | WO 9927058 | | 6/1999 | |
| WO | WO 0071240 | A1 | 11/2000 | |
| WO | WO 0071241 | A1 | 11/2000 | |
| WO | WO 0071591 | | 11/2000 | |
| WO | WO 0071652 | A2 | 11/2000 | |
| WO | WO 0071658 | A1 | 11/2000 | |
| WO | WO 0071659 | A1 | 11/2000 | |

(Continued)

OTHER PUBLICATIONS

Database WPI Week 199128, Thomson Scientific, London, G:; AN 1991-205960; XP002474989 & SU 1 587 056 A "Blood Substitute Hormona"; Aug. 23, 1990.
Database WPI Week 199122; Thomson Scientific, London, GB; AN 1991-162180; XP002474990 & SU 1 578 083 A; Mosvodokanalniiproekt; Jul. 15, 1990.
Gottschalck, et al; International Cosmetic Ingredient Dictionary and Handbook; Eleventh Edition 2006; vol. 2; p. 1847.

(Continued)

*Primary Examiner* — Nicole M Buie-Hatcher
*Assistant Examiner* — M. Reza Asdjodi
(74) *Attorney, Agent, or Firm* — Hunton & Williams LLP

(57) ABSTRACT

The invention relates to a composition for processing and/or modifying surfaces, in particular hard surfaces. The composition includes a synthetic copolymer that comprises cationic units and units derived from a vinyl-lactam.

23 Claims, 2 Drawing Sheets

(56) References Cited

FOREIGN PATENT DOCUMENTS

| WO | WO 0071660 A1 | 11/2000 |
| WO | WO 0105920 A1 | 1/2001 |
| WO | WO 0105921 A1 | 1/2001 |
| WO | WO 0105922 A1 | 1/2001 |
| WO | WO 02026844 A2 | 4/2002 |
| WO | WO 2005/097959 A1 * | 11/2005 |
| WO | WO 2006035154 | 4/2006 |

OTHER PUBLICATIONS

European Patent Office; International Search Report; International Application No. PCT/EP2008/063962, mailed Mar. 27, 2009.

* cited by examiner

COPOLYMER FOR PROCESSING OR MODIFYING SURFACES

CROSS-REFERENCE TO RELATED APPLICATIONS

This application is the U.S. National Phase of International Application Number PCT/EP2008/063962 filed on Oct. 16, 2008, which claims priority to French Application No. FR 07 07785, filed Nov. 6, 2007, and French Application No. FR 08 01226, filed Mar. 6, 2008, each of which is incorporated by reference herein in its entirety.

FIELD OF THE INVENTION

A subject-matter of the present invention is a composition for treating and/or modifying surfaces, in particular hard surfaces. The composition comprises a synthetic copolymer comprising cationic units and units deriving from a vinyllactam.

A subject matter of the present invention is in particular a cleaning or rinsing composition intended for the treatment of surfaces of textile type or of industrial, domestic or communal hard surfaces, in particular of ceramic, tiling, window, metal, melamine, formica or plastic type, targeted at conferring on the latter in particular properties of improved drying and/or persistent antideposition and/or antiadhesion properties with regard to soiling substances; in addition, it can contribute antistatic, gloss or slip-resistance properties to the latter.

A subject matter of the invention is more particularly a cleaning or rinsing composition intended for the treatment of a surface, which composition is capable of conferring, on the latter, properties of improved drying and/or persistent hydrophilicity, antideposition and/or antiadhesion properties with regard to soiling substances, so as to prevent the subsequent presence of marks due in particular:
- to the drying of drops of water deposited on said surface (for example deposit of inorganic salts)
- to the attachment of inorganic or organic particles present in the surrounding air (case of the cleaning of skyscrapers) or deposited by contact (case of the cleaning of floors, toilets, and the like)
- to the deposition by spattering of fatty organic compounds (cooking fats)
- to the deposition of soaps and their metal salts
- to the deposition of compounds of vegetable origin of hydrocolloid or polysaccharide type.

BACKGROUND

Commercial detergent formulations make it possible to efficiently clean industrial, domestic or communal hard surfaces. They are generally composed of an aqueous solution of surfactants, in particular of nonionic and anionic or nonionic and cationic surfactants, of solvents, of alcohol(s), in order to facilitate drying, and optionally of sequestering agents and of bases or acids, in order to adjust the pH. A frequent disadvantage of these detergent formulations is that the subsequent contact of the hard surface with water results, during drying, in the formation of marks. In addition, the treatment with these formulations is only, for the majority of them, purely curative and not preventative. Thus, industrial or domestic cleaners are effective in cleaning the soiled hard surface but do not make it possible to prevent or limit the future fouling thereof or even to promote the subsequent cleaning thereof.

For treating and/or modifying hard surfaces, in particular for the cleaning of hard surfaces, it is known to use compositions comprising synthetic polymers.

It has thus been proposed to use linear polymers or copolymers to render hard surfaces hydrophilic, for example copolymers deriving from cationic monomers, from acrylic acid and optionally from other monomers, such as acrylamide. Such applications and such compositions are described in particular in the documents EP-A-1 196 527, EP-A-1 196 528 and EP-A-1 196 523.

During many cleaning operations, water or an aqueous composition is applied to the item to be cleaned, rinsing is optionally carried out and then drying is allowed to take place. This is the case, for example, during the cleaning of dishes by hand or during the automatic cleaning of dishes using a dishwasher. The drying phase can take a certain time and/or can leave marks of water-soluble or water-dispersible materials (for example marks of inorganic matter included in the water) and/or marks of contaminants, generally grease, originating from the item to be cleaned.

It is known to add poly(vinylpyrrolidone) (PVP) to some compositions for cleaning hard surfaces, in particular to compositions for cleaning surfaces made of tiling or to compositions for cleaning the surface of toilet bowls. On these ceramic surfaces, PVP makes possible drying which is rapid and noticeable: the composition may be observed to gradually leave the surface and a composition front which moves over the surface like the ebb of a wave may be observed. The term "progressive dewetting" is often used; it concerns a discharge of the water by flow rather than by evaporation. This is appreciated by the consumer, who notices the effect of the composition and/or who notices that drying is efficient. The drying obtained subsequent to the application of a composition comprising PVP is in fact fast. Discharge by flow also makes it possible to limit the marks.

However, PVP has a limited field of application: it cannot be formulated in some compositions, in particular in compositions for cleaning dishes, or can be formulated only with difficulty within very narrow formulation windows. This is because, in compositions for cleaning dishes, which generally have significant charges of surfactants, it is poorly dispersible and/or of low stability in these compositions. It can in particular be harmful to the transparency of the compositions, while transparency is a quality desired by consumers.

The quality of the drying subsequent to the application of a composition for cleaning dishes, in particular, remains to be improved. There exists a need for compositions for treating and/or modifying surfaces, in particular hard surfaces, in particular compositions for cleaning dishes, which exhibit improved drying properties. There exists a need for compounds which can contribute such improvements and which can be easily formulated in compositions for treating and/or modifying surfaces.

Generally, there remains a need for novel compositions for treating and/or modifying surfaces and/or for novel uses of synthetic polymers, in order in particular to provide compositions which are more effective for certain functions, and/or compositions exhibiting novel properties, and/or compositions which are less expensive, and/or compositions comprising smaller amounts of active material.

SUMMARY OF THE INVENTION

The present invention meets at least one of the abovementioned needs by providing a composition for treating and/or modifying surfaces comprising a copolymer comprising cationic units A and other units B, characterized in that:

the units A comprise at least one quaternary ammonium group or one inium group, and the units B are units deriving from a vinyllactam.

In the continuation, the copolymer is denoted by "copolymer of the invention".

The copolymer of the invention can in particular provide the following advantages:

improvement in the antideposition and/or antiadhesion properties with regard to soiling substances capable of being deposited on said surfaces, and/or improvement in the drying.

The copolymer of the invention can in particular provide the following advantages, in particular, for example, to a composition for cleaning dishes:

ease of formulation of the composition, adjustability and/or adaptability to a large number of compositions, preservation of the transparency of the composition, progressive dewetting, which is preferably sufficiently slow to be noticeable and/or to prevent marks, accelerated drying, absence of or reduction in marks left on drying, drying noticeable by the consumer, in particular by observation, combination of at least two of these advantages.

These advantages are particularly advantageous in the context of the cleaning of transparent items, in particular of transparent items of the dishes, especially made of glass or crystal. These advantages and/or the perception of these advantages can in particular be usefully communicated, in connection with the copolymer or simply in connection with the composition, by any communication means related to the product, for example on the label, in an advertisement, via a customer service department or via an internet site.

The copolymer of the invention is preferably employed or is present in said composition in an amount effective in contributing, to said surfaces, drying which is improved and/or antideposition and/or antiadhesion properties with regard to soiling substances capable of being deposited on said surfaces. The composition can in particular exhibit slow dewetting and/or rapid and/or mark-free drying.

The invention also relates to the use of the copolymer in compositions for treating and/or modifying surfaces. It can in particular be used as agent which promotes slow dewetting and/or rapid and/or mark-free drying.

The invention also relates to a process for treating and/or modifying surfaces by application of the copolymer of the invention to the surface, preferably in the composition of the invention, said composition being optionally diluted in water beforehand. The invention also relates to the surfaces thus treated and/or modified.

DETAILED DESCRIPTION OF PREFERRED EMBODIMENTS

Definitions

Figure 1:
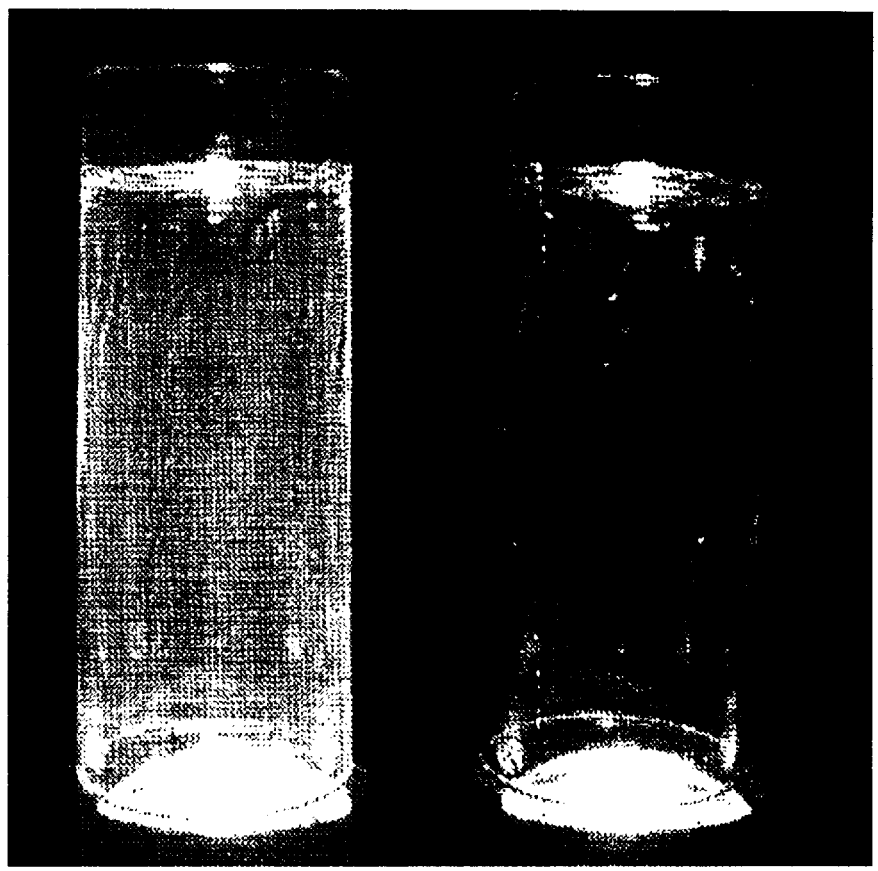
FIG. 1 is a photograph that shows, on the left, a glass after washing and drying according to Example 2.1 and, on the right, a glass after washing and drying according to Example 2.2.

In the present patent application, unit deriving from a monomer denotes, for the units other than the $A_{precursor}$ units, a unit which can be obtained directly from said monomer by polymerization. Thus, for example, a unit deriving from an acrylic or methacrylic acid ester does not cover a unit of formula —$CH_2$—CH(COOH)—, —$CH_2$—C($CH_3$)(COOH)— or —$CH_2$—CH(OH)—, respectively, for example obtained by polymerizing an acrylic or methacrylic acid ester or vinyl acetate, respectively, and by then hydrolyzing. A unit deriving from acrylic or methacrylic acid covers, for example, a unit obtained by polymerizing a monomer (for example an acrylic or methacrylic acid ester) and by then reacting (for example by hydrolysis) the polymer obtained so as to obtain units of formula —$CH_2$—CH(COOH)— or —$CH_2$—C($CH_3$)(COOH)—. A unit deriving from, a vinyl alcohol covers, for example, a unit obtained by polymerizing a monomer (for example a vinyl ester) and by then reacting (for example by hydrolysis) the polymer obtained so as to obtain units of formula —$CH_2$—CH(OH)—. Units deriving from a monomer A may, for example, have been obtained by polymerization of monomers $A_{precursor}$ followed by a postpolymerization reaction in order to obtain units comprising the betaine group. The units A are not regarded as units deriving from monomers $A_{precursor}$ not comprising a betaine group.

In the present patent application, unless otherwise indicated, when reference is made to molar mass, it will relate to the absolute weight-average molar mass, expressed in g/mol. This can be determined by aqueous gel permeation chromatography (GPC), by light scattering (DLS or MALLS for an aqueous eluent), with an aqueous eluent or an organic eluent (for example formamide), according to the composition of the polymer.

In the present patent application, unless otherwise mentioned, the amounts and proportions are indicated as active material (in contrast to diluted or dispersed material) and by weight.

Copolymer

The copolymer of the invention comprises cationic units A and other units B. The units A comprise at least one quaternary ammonium group or one inium group. The units B are units deriving from a vinyllactam. The units A typically derive from a monomer A comprising an ethylenic unsaturation.

The copolymer is preferably a linear random copolymer. It is noted that the positive charge carried by a nitrogen atom is typically located in a side group of the macromolecular chain of which the copolymer is formed. The macromolecular chain is typically a polyethylenic chain (originating from the unsaturations of the monomers), with side cationic groups and side lactam groups.

Cationic Units A

The units A are cationic units. They comprise cationic groups comprising a quaternary ammonium group or an inium group. In the present patent application, the cationic groups do not cover potentially cationic groups of weak base type capable of becoming cationic by addition of a proton, such as primary or secondary amines, or even such as amide groups. The cationic groups can in particular be groups of the following types:

quaternary ammonium (of formula —$N^+R_3$ where R, identical or different, is a group other than the hydrogen atom, for example an optionally substituted hydrocarbon group, if appropriate interrupted by heteroatoms, for example a linear or branched $C_1$-$C_{22}$ alkyl group, for example a methyl group), or inium (of formula $=N^+R_2$ where R, identical or different, is a group other than the hydrogen atom, one of which, if appropriate, forms part of a ring connected to the double bond, said ring being, if appropriate, aromatic, it being possible for at least one of the R groups to be, for example, an optionally substituted hydrocarbon group, if appropriate interrupted by heteroatoms, for example a linear or branched $C_1$-$C_{22}$ alkyl group, for example a methyl group).

In the case of the groups of quaternary ammonium type, the group concerned may in particular be a trimethylammonium group.

In the case of the inium groups, the group concerned may in particular be a pyridinium group, preferably an alkylpyridinium group, preferably a methylpyridinium group.

The cationic group can be combined with a counterion (an anion). It can in particular be a chloride, bromide, iodide, methyl sulfate or ethyl sulfate ion. It is observed that the anionic or potentially anionic groups of the part A can constitute all or a portion of the counterions combined with the cationic group. Mention is made that the cationic units are not zwitterionic units comprising both a cationic group and an anionic or potentially anionic group (they would then have a zero charge overall). In other words, the R groups mentioned above do not comprise an anionic substituent.

Mention may be made, as examples of monomers A from which the units A can be derived, of:
trimethylammoniopropyl methacrylate chloride,
trimethylammonioethylacrylamide or -methacrylamide chloride or bromide,
trimethylammoniobutylacrylamide or -methylacrylamide methyl sulfate,
trimethylammoniopropylmethacrylamide methyl sulfate (MAPTA MeS),
(3-methacrylamidopropyl)trimethylammonium chloride (MAPTAC),
(3-acrylamidopropyl)trimethylammonium chloride (APTAC),
methacryloyloxyethyltrimethylammonium chloride or methyl sulfate,
acryloyloxyethyltrimethylammonium salts (ADAMQUAT),
N,N-dimethyldiallylammonium chloride (DADMAC);
dimethylaminopropylmethacrylamide, N-(3-chloro-2-hydroxypropyl)trimethylammonium chloride (DIQUAT);
the monomer of formula:

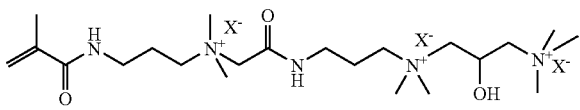

where $X^-$ is an anion, preferably chloride or methyl sulfate,
1-ethyl-2-vinylpyridinium or 1-ethyl-4-vinylpyridinium bromide, chloride or methyl sulfate;
their mixtures or combinations.

The units A can in particular be obtained by copolymerization of monomers comprising the monomers A as a mixture with other monomers. They can also be obtained by polymerization, in order to form units $A_{precursor}$, of monomers comprising precursor monomers of the units A (as a mixture with other monomers), resulting in precursor units of the units A, followed by chemical modification of the precursor units in order to obtain the units A. Such modifications are known. They can, for example, be quaternizations, for example using dimethyl sulfate or quaternary haloalkylammoniums or quaternary haloalkylhydroxyalkylammoniums.

Units B

The units B are units deriving from a vinyllactam, such as vinylcaprolactam or vinylpyrrolidone. Such monomers are known. It is specified that preferably N-vinyl-pyrrolidone is concerned.

Specific Compositions of the Copolymer

The copolymer of the invention can comprise optional units $C_{other}$ which are different from the abovementioned units A and B. The units A and B can represent from 1 to 100 mol %, preferably from 50 to 100 mol % and preferably from 75 to 100 mol % of the units of the copolymer.

According to a specific embodiment, the copolymer comprises:
from 1 to 25 mol % of units A, preferably from 3 to 13 mol %, and
from 75 to 99 mol % of units B, preferably from 87 to 97 mol %.

According to a specific embodiment, the molar ratio of the units A to the units B is between 1/99 and 25/75, preferably between 5/95 and 15/85.

The copolymer can in particular comprise, as units $C_{other}$:
hydrophilic or hydrophobic nonionic units $C_N$, and/or
anionic or potentially anionic units $C_A$, and/or
cationic or potentially cationic units $C_C$ which are different from the units A, and/or
zwitterionic units $C_Z$.

According to an advantageous form, the copolymer does not comprise more than 25 mol % in total of such units; preferably, it does not comprise any at all. According to an advantageous form, the copolymer does not comprise more than 25 mol % in total of units $C_N$; preferably, it does not comprise any at all. According to an advantageous form, the copolymer does not comprise more than 25 mol % in total of units $C_A$; preferably it does not contain any at all. According to an advantageous form, the copolymer does not comprise more than 25 mol % in total of units $C_C$; preferably, it does not comprise any at all. According to an advantageous form, the copolymer does not comprise more than 25 mol % in total of units $C_Z$; preferably, it does not comprise any at all.

According to specific embodiments, the copolymer is substantially devoid (it comprises less than 1 mol % thereof, preferably less than 0.5 mol % thereof, preferably does not comprise any at all) of the following units:
units $C_C$, and/or
units $C_N$ chosen from:
alkoxylated units of following formula:

in which:
$R^5$ is a hydrogen atom or a methyl group,
$X^2$ is a group of formula —CO—O—, —CO—NH— or —$C_6H_4$—$CH_2$—,
N is a whole or mean number greater than or equal to 1,
$R^7$ is a hydrogen atom, an alkyl group or a tristyrylphenyl group, and/or
hydroxylated units of following formula:

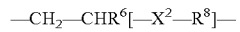

in which:
$R^6$ is a hydrogen atom or a methyl group,
$X^2$ is a group of formula —CO—O—, —CO—NH— or —$C_6H_4$—$CH_2$—, R[8] is a hydrocarbon group having at least two carbon atoms which comprises at least two —OH groups, preferably on two consecutive carbon atoms, and/or
hydroxyalkyl acrylate or methacrylate units, hydrophobic units $C_N$, and/or
units $C_Z$ comprising a sulfobetaine group, preferably all the zwitterionic units $C_Z$.

Thus, according to a specific embodiment:
the copolymer is substantially devoid of zwitterionic units, and
the copolymer is substantially devoid of anionic or potentially anionic units.

According to a particularly useful embodiment, the units A derive from N,N-dimethyldiallylammonium chloride (DADMAC) and the units B derive from vinylpyrrolidone. The following copolymers prove to be very particularly useful:
copolymers comprising:
from 1 to 25 mol %, preferably from 3 to 13 mol %, of units A deriving from N,N-dimethyldiallylammonium chloride (DADMAC), and
from 75 to 99 mol %, preferably from 87 to 97 mol %, of units B deriving from vinylpyrrolidone.

It is mentioned that the copolymer can be provided in any practical form, for example in the dry solid form or in the vectorized form, for example in the form of a solution or of an emulsion or of a suspension, in particular in the form of an aqueous solution. The vectorized form, for example an aqueous solution, can in particular comprise from 5 to 50% by weight of the copolymer, for example from 10 to 30% by weight. The aqueous solution can in particular be a solution obtained by an aqueous-phase preparation process, in particular a radical polymerization process.

The polymer of the invention can in particular exhibit a molar mass ranging from 20 000 g/mol to 1 000 000 g/mol, preferably from 100 000 g/mol to 400 000 g/mol.

Process for the Preparation of the Copolymer

The copolymer of the invention can be prepared by any appropriate process. The process will generally comprise a stage of radical polymerization (copolymerization), where monomers and a source of free radicals are brought together.

According to one embodiment, a mixture of monomers $A_{precursor}$ and of vinyllactam is polymerized (copolymerization) in the presence of a source of free radicals, in order to obtain a copolymer comprising units B and units deriving from the monomers $A_{precursor}$ and then these units are chemically modified in order to obtain units A (postpolymerization modification). Modifications can in particular be quaternizations of units deriving from the monomers $A_{precursor}$ comprising a tertiary amine group.

According to a preferred embodiment, the process comprises a stage of copolymerization by bringing together:
a monomer A (or $A_{precursor}$) comprising an ethylenically unsaturated group and a cationic group,
vinyllactam, and
a source of free radicals.

The radical polymerization processes are known to a person skilled in the art. In particular, the source of free radicals, the amount of free radicals, the steps for introducing the various compounds (monomers, source of free radicals, and the like), the polymerization temperature and other operating parameters or conditions can be varied in a known and appropriate way. A few details or instructions are given below.

The processes can be processes of batch type, of semibatch type or even of continuous type. A process of semibatch type typically comprises a step of gradual introduction of at least one monomer (comonomer), preferably of all the monomers (comonomers), into a reactor, without continuous departure of the reaction product, the reaction product, comprising the polymer, being recovered all at once at the end of the reaction.

It is noted that the polymerization can advantageously be carried out in aqueous solution.

Any source of free radicals can be used. It is possible in particular to generate free radicals spontaneously, for example by increasing the temperature, with appropriate monomers, such as styrene. It is possible to generate free radicals by irradiation, in particular by UV irradiation, preferably in the presence of appropriate UV-sensitive initiators. It is possible to use initiators or initiator systems of radical or redox type. The source of free radicals may or may not be water-soluble. It may be preferable to use water-soluble initiators or at least partially water-soluble initiators (for example, soluble in water to at least 50% by weight).

Generally, the greater the amount of free radicals, the more easily the polymerization is initiated (it is promoted) but the lower the molecular weights of the copolymers obtained.

Use may in particular be made of the following initiators:
hydrogen peroxides, such as: tert-butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, potassium persulfate or ammonium persulfate,
azo compounds, such as: 2,2'-azobisisobutyronitrile, 2,2'-azobis(2-butanenitrile), 4,4'-azobis(4-pentanoic acid), 1,1'-azobis(cyclohexanecarbonitrile), 2-(t-butylazo)-2-cyanopropane, 2,2'-azobis{2-methyl-N-[1,1-bis(hydroxymethyl)-2-hydroxyethyl]propionamide}, 2,2'-azobis[2-methyl-N-(hydroxyethyl)propionamide], 2,2'-azobis(N,N'-dimethyleneisobutyramidine) dihydrochloride, 2,2'-azobis(2-amidinopropane) dihydrochloride, 2,2'-azobis(N,N'-dimethyleneisobutyramide), 2,2'-azobis{2-methyl-N-[1,1-bis(hydroxymethyl)-2-hydroxyethyl] propionamide}, 2,2'-azobis{2-methyl-N-[1,1-bis(hydroxymethyl)ethyl]propionamide}, 2,2'-azobis[2-methyl-N-(2-hydroxyethyl)propionamide] or 2,2'-azobis(isobutyramide)dihydrate,
redox systems comprising combinations, such as:
mixtures of hydrogen peroxide, alkyl peroxide, peresters, percarbonates and the like and of any iron salt, titanous salt, zinc formaldehydesulfoxylate or sodium formaldehydesulfoxylate, and reducing sugars,
alkali metal or ammonium persulfates, perborates or perchlorates, in combination with an alkali metal bisulfite, such as sodium metabisulfite, and reducing sugars, and
alkali metal persulfates in combination with an arylphosphinic acid, such as benzenephosphonic acid and others of a like nature, and reducing sugars.

The polymerization temperature can in particular be between 25° C. and 95° C. The temperature can depend on the source of free radicals. If it is not a source of UV initiator type, it will be preferable to operate between 50° C. and 95° C., more preferably between 60° C. and 80° C. Generally, the higher the temperature, the more easily the polymerization is initiated (it is promoted) but the lower the molecular weights of the copolymers obtained.

Composition and Uses

The composition of the invention can be provided in varied forms. It can in particular be provided in a liquid form. It can then comprise a liquid application vector, for example water, an alcohol or a water/alcohol mixture.

The composition of the invention most often comprises at least one surfactant.

According to one embodiment, the surface is a textile, the treatment preferably being a treatment in which laundry is cleaned or rinsed. It is mentioned that the treatment is typically a treatment applied to a finished textile article, where the fibers are gathered together. In other words, the treatment is not typically a treatment carried out during the manufacture of the textile article. It is typically a stage of treatment (cleaning, rinsing and/or softening) after a first use (at least) by the consumer. The laundry can in particular comprise articles made of cotton or based on cotton and/or on wool. It can, alternatively or supplementarily, comprise articles made of synthetic fibers, in particular of polyester, of polyamide or of acrylic.

The compositions can in particular be compositions for washing and/or rinsing and/or softening articles made of textile fibers, for the prespotting of articles made of textile fibers, for the drying in a tumble dryer of articles made of textile fibers and for facilitating the ironing of articles made of textile fibers.

The composition and the conditions for use (or for treatment) can take many forms.

Said composition can be provided
  in the form of a solid (powder, granules, tablets, and the like) or of a concentrated aqueous dispersion or solution brought into contact with the articles to be treated after dilution in water;
  in the form of a concentrated aqueous dispersion or solution deposited beforehand on the dry articles to be treated before dilution in water;
  in the form of an aqueous dispersion or solution to be deposited directly on the dry articles to be treated without dilution or of a solid support (stick) comprising the copolymer to be applied directly to the dry articles to be treated;
  in the form of an insoluble solid support comprising the copolymer brought directly into contact with the articles to be treated in the wet state.

Thus, the composition of the invention can be:
  a solid or liquid detergent formulation capable of directly forming a detergent bath by dilution;
  a liquid rinsing and/or softening formulation capable of directly forming a rinsing and/or softening bath by dilution;
  a solid material, in particular a textile material, comprising the copolymer intended to be brought into contact with wet articles in a tumble dryer (said solid material is referred to subsequently as "drying additive");
  an aqueous ironing formulation;
  a washing additive (prespotter) intended to be deposited on dry articles prior to a washing operation using a detergent formulation which may or may not comprise the copolymer (said additive is referred to subsequently as "prespotter").

The composition of the invention is particularly well suited to the care of articles (laundry) in particular based on cotton, especially comprising at least 35% of cotton. It is very particularly suited to the care of colored articles.

The amount of copolymer of the invention present in the composition for the treatment of textile articles according to the invention can range from 0.05 to 10%, on a dry basis, of the weight of said composition, on a dry basis.

Other constituents can be present in the composition for the treatment of textiles. Said composition can comprise at least one surface-active agent and/or one detergency and/or rinsing and/or softening additive for articles made of textile fibers. The nature of these constituents depends on the use desired for said composition.

Thus, when the composition is a detergent formulation for washing articles made of textile fibers, it generally comprises:
  at least one natural and/or synthetic surface-active agent,
  at least one detergency adjuvant (builder),
  optionally an oxidizing agent or system,
  and a series of specific additives.

The formulation for the treatment of textiles can in particular comprise surface-active agents in an amount corresponding to approximately 1 to 40% by weight, with respect to the detergent formulation.

According to another embodiment, the surface is a hard surface, the treatment preferably being a treatment in which a hard surface is cleaned. The hard surfaces and their treatments and/or modifications include, in the present invention, dishes and the cleaning and/or rinsing thereof. The treatment can be one in which dishes are cleaned automatically or by hand.

The composition according to the invention is in particular capable of contributing, to the hard surfaces to be treated, antideposition and/or antiadhesion properties with regard to soiling substances and/or properties of improved drying. It can, for example, be:
  a cleaning or rinsing composition for domestic use; it can be universal or can be more specific, such as a composition for cleaning or rinsing
    the bathroom; said composition prevents in particular deposition of soap salts around bath tubs and on bathroom sinks, prevents the growth and/or the deposition of calcium crystals on these surfaces, and, delays the appearance of subsequent soap stains;
    the kitchen; said composition makes it possible to improve the cleaning of worktops when the latter are soiled by unsaturated fatty soiling substances capable of crosslinking over time; the greasy stains come off with water without rubbing;
    floors (made of linoleum, tiling or cement); said composition makes it possible to improve the removal of dust or soiling substances of argilo-calcareous types (soil, sand, mud, and the like); stains on the floor can be cleaned without effort by simple sweeping, without brushing; in addition, said composition contributes slip-resistance properties;
    toilets; said composition makes it possible to prevent the adhesion of traces of excrement to the surface; the flow alone of the flush of water is sufficient to remove these traces; the use of a brush is unnecessary;
    windows or mirrors; said composition makes it possible to prevent the deposition of inorganic or organic particulate soiling substances on the surface;
    dishes, by hand or using an automatic device; said composition makes it possible to observe improved drying.
  A cleaning or rinsing composition for industrial or communal use; it can be universal or more specific, such as a composition for cleaning
    reactors, steel blades, sinks or tanks,
    dishes,
    exterior or interior surfaces of buildings,
    windows of buildings, including apartment buildings,
    bottles.

The composition according to the invention can be provided in any form and can be used in multiple ways. Thus, it can be in the form
  of a gelled or ungelled liquid to be deposited as such, in particular by spraying, directly on the surfaces to be cleaned or rinsed, or on a sponge or another support (woven or nonwoven article made of cellulose, for example) before being applied to the surface to be treated, of a gelled or ungelled liquid to be diluted in water (optionally with the addition of another solvent) before being applied to the surface to be treated, of a gelled or ungelled liquid held in a water-soluble bag, of a foam, of an aerosol, of a liquid absorbed on an absorbent support made of an article which is woven or nonwoven in particular (wipe), of a solid, in particular a tablet, optionally held in a water-soluble bag, it being possible for said composition to represent all or part of the tablet.

For satisfactory implementation of the invention, the copolymer of the invention is present in the composition forming the subject matter of the invention in an amount which is effective in modifying and/or treating the surface. It can, for example, be an amount which is effective in contributing, to said surfaces, antideposition and/or antiadhesion properties with regard to soiling substances capable of being deposited on said surfaces and/or in contributing improved drying.

Said composition forming the subject matter of the invention can comprise, depending on its application, from 0.001 to 10% of its weight of the copolymer of the invention.

The pH of the composition or the pH of use of the composition according to the invention can vary, depending on the applications and the surfaces to be treated, from 1 to 14, indeed even from 0.5 to 14. Extreme pH values are conventional in the applications of industrial or communal cleaning type. In the field of domestic applications, the pH values range instead from 1 to 13, depending on the applications.

Said composition can be employed for the cleaning or rinsing of hard surfaces in an amount such that, after optional rinsing and after drying, the amount of polybetaine (B) deposited on the surface is from 0.0001 to 10 mg/m$^2$, preferably from 0.001 to 5 mg/m$^2$, of surface treated.

The composition according to the invention, when it is employed in the context of a treatment of a textile surface, such as laundry to be cleaned, is in particular capable of protecting the colors of the textile and/or of preventing the transfer of colors from one article to another, in particular in a detergent bath. Thus, use may be made of the copolymer of the invention as agent for protecting the color of the laundry and/or as agent for preventing the transfer of colors.

The cleaning or rinsing composition according to the invention preferably comprises, in addition, at least one surfactant. The latter can be nonionic, anionic, amphoteric, zwitterionic or cationic. It can also be a mixture or a combination of surfactants.

Mention may be made, among anionic surface-active agents, by way of examples, of:

alkyl ester sulfonates of formula R—CH(SO$_3$M)-COOR', where R represents a $C_8$-$C_{20}$, preferably $C_{10}$-$C_{16}$, alkyl radical, R' represents a $C_1$-$C_6$, preferably $C_1$-$C_3$, alkyl radical and M represents an alkali metal (sodium, potassium or lithium) cation, a substituted or unsubstituted ammonium (methyl-, dimethyl-, trimethyl- or tetramethylammonium, dimethylpiperidinium, and the like) cation or a cation derived from an alkanolamine (monoethanolamine, diethanolamine, triethanolamine, and the like). Mention may very particularly be made of methyl ester sulfonates in which the R radical is a $C_{14}$-$C_{16}$ radical;

alkyl sulfates of formula ROSO$_3$M, where R represents a $C_5$-$C_{24}$, preferably $C_{10}$-$C_{18}$, alkyl or hydroxyalkyl radical (such as salts of fatty acids derived from copra and tallow), M representing a hydrogen atom or a cation with the same definition as above, and their ethoxylated (EO) and/or propoxylated (PO) derivatives, having on average from 0.5 to 30, preferably from 0.5 to 10, EO and/or PO units;

alkylamide sulfates of formula RCONHR'OSO$_3$M, where R represents a $C_2$-$C_{22}$, preferably $C_6$-$C_{20}$, alkyl radical and R' represents a $C_2$-$C_3$ alkyl radical, M representing a hydrogen atom or a cation with the same definition as above, and their ethoxylated (EO) and/or propoxylated (PO) derivatives, having on average from 0.5 to 60 EO and/or PO units;

salts of saturated or unsaturated $C_8$-$C_{24}$, preferably $C_{14}$-$C_{20}$, fatty acids, $C_9$-$C_{20}$ alkylbenzenesulfonates, primary or secondary $C_8$-$C_{22}$ alkylsulfonates, alkylglycerolsulfonates, the sulfonated polycarboxylic acids described in GB-A-1 082 179, paraffin sulfonates, N-acyl-N-alkyltaurates, isethionates, alkylsuccinamates, alkylsulfosuccinates, monoesters or diesters of sulfosuccinates, N-acylsarcosinates, alkylglycoside sulfates, polyethoxycarboxylates, monoglyceride sulfates and condensates of fatty acid chlorides with hydroxyalkylsulfonates; the cation can be an alkali metal (sodium, potassium or lithium), a substituted or unsubstituted ammonium (methyl-, dimethyl-, trimethyl- or tetramethylammonium, dimethylpiperidinium, and the like) residue, or a residue derived from an alkanolamine (monoethanolamine, diethanolamine, triethanolamine, and the like);

alkyl phosphates, or alkyl or alkylaryl phosphate esters, such as Rhodafac RA600, Rhodafac PA15 or Rhodafac PA23, sold by Rhodia; the cation can be an alkali metal (sodium, potassium or lithium), a substituted or unsubstituted ammonium (methyl-, dimethyl-, trimethyl- or tetramethylammonium, dimethylpiperidinium, and the like) residue, or a residue derived from an alkanolamine (monoethanolamine, diethanolamine, triethanolamine, and the like).

A description of nonionic surface-active agents is given in U.S. Pat. Nos. 4,287,080 and 4,470,923. Mention may in particular be made of condensates of alkylene oxide, in particular of ethylene oxide and optionally of propylene oxide, with alcohols, polyols, alkylphenols, fatty acid esters, fatty acid amides and fatty amines; amine oxides; sugar derivatives, such as alkylpolyglycosides or esters of fatty acids and of sugars, in particular sucrose monopalmitate; long-chain (of 8 to 28 carbon atoms) tertiary phosphine oxides; dialkyl sulfoxides; block copolymers of polyoxyethylene and of polyoxypropylene; polyalkoxylated esters of sorbitan; fatty esters of sorbitan; poly(ethylene oxide)s and fatty acid amides modified so as to confer thereon a hydrophobic nature (for example, fatty acid mono- and diethanolamides comprising from 10 to 18 carbon atoms).

Mention may very particularly be made of:

polyoxyalkylenated $C_8$-$C_{18}$ aliphatic carboxylic acids comprising from 2 to 50 oxyalkylene (oxyethylene and/or oxypropylene) units, in particular those with 12 (mean) carbon atoms or with 18 (mean) carbon atoms, polyoxyalkylenated $C_6$-$C_{24}$ aliphatic alcohols comprising from 2 to 50 oxyalkylene (oxyethylene and/or oxypropylene) units, in particular those with 12 (mean) carbon atoms or with 18 (mean) carbon atoms; mention may be made of Antarox B12DF, Antarox FM33, Antarox FM63 and Antarox V74 from Rhodia, Plurafac LF 400 and Plurafac LF 220 from BASF, Rhodasurf ID 060, Rhodasurf ID 070 and Rhodasurf LA 42 from Rhodia and Synperonic A5, A7 and A9 from ICI, amine oxides, such as dodecyldi(2-hydroxyethyl)amine oxide, phosphine oxides, such as tetradecyldimethylphosphine oxide.

Mention may be made, among amphoteric surface-active agents, of:

- sodium iminodipropionates or alkyliminopropionates, such as Mirataine H2C HA and Mirataine JC HA from Rhodia,
- alkyl amphoacetates or alkyl amphodiacetates, the alkyl group of which comprises from 6 to 20 carbon atoms, such as Miranol C2M Conc NP, sold by Rhodia,
- amphoteric alkylpolyamine derivatives, such as Amphionic XL®, sold by Rhodia, and Ampholac 7T/X® and Ampholac 7C/X®, sold by Berol Nobel.

Mention may be made, among zwitterionic surface-active agents, of those described in U.S. Pat. No. 5,108,660.

The preferred zwitterionic surfactants are alkyl dimethyl betaines, alkyl amidopropyldimethyl betaines, alkyl dimethyl sulfobetaines or alkyl amidopropyldimethyl sulfobetaines, such as Mirataine JCHA, Mirataine H2CHA or Mirataine CBS, sold by Rhodia, or those of the same type sold by Sherex Company under the name of "Varion CADG Betaine" and "Varion CAS Sulfobetaine", or the condensation products of fatty acids and of protein hydrolysates.

Other zwitterionic surfactants are also described in U.S. Pat. No. 4,287,080 and in U.S. Pat. No. 4,557,853.

Mention may in particular be made, among cationic surface-active agents, of the quaternary ammonium salts of formula

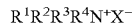

$$R^1R^2R^3R^4N^+X^-$$

where $R^1$, $R^2$ and $R^3$, which are identical or different, represent H or an alkyl group comprising less than 4 carbon atoms, preferably 1 or 2 carbon atom(s), which is optionally substituted by one or more hydroxyl functional group(s), or can form, together with the nitrogen atom $N^+$, at least one aromatic or heterocyclic ring, $R^4$ represents a $C_8$-$C_{22}$, preferably $C_{12}$-$C_{22}$, alkyl or alkenyl group or an aryl or benzyl group, and $X^-$ is a solubilizing anion, such as halide (for example, chloride, bromide or iodide), sulfate or alkyl sulfate (methyl sulfate), carboxylate (acetate, propionate or benzoate), alkylsulfonate or arylsulfonate.

Mention may in particular be made of dodecyltrimethylammonium bromide, tetradecyltrimethylammonium bromide, cetyltrimethylammonium bromide, stearylpyridinium chloride, Rhodaquat® TFR and Rhodamine® C15, which are sold by Rhodia, cetyltrimethylammonium chloride (Dehyquart ACA and/or AOR from Cognis) or cocobis(2-hydroxyethyl)ethylammonium chloride (Ethoquad C12 from Akzo Nobel).

Mention may also be made of other cationic surface-active agents, such as:

quaternary ammonium salts of formula

$$R^{1'}R^{2'}R^{3'}R^{4'}N^+X^-$$

where $R^{1'}$ and $R^{2'}$, which are identical or different, represent H or an alkyl group comprising less than 4 carbon atoms, preferably 1 or 2 carbon atom(s), which is optionally substituted by one or more hydroxyl functional group(s), or can form, together with the nitrogen atom $N^+$, a heterocyclic ring, $R^{3'}$ and $R^{4'}$ represent a $C_8$-$C_{22}$, preferably $C_{10}$-$C_{22}$, alkyl or alkenyl group or an aryl or benzyl group, and $X^-$ is an anion, such as halide (for example, chloride, bromide or iodide), sulfate or alkyl sulfate (methyl sulfate), carboxylate (acetate, propionate or benzoate), alkylsulfonate or arylsulfonate.

Mention may in particular be made of: dialkyldimethylammonium chlorides, such as ditallowdimethylammonium chloride or methyl sulfate, and the like, or alkylbenzyldimethylammonium chlorides.

($C_{10}$-$C_{25}$)alkylimidazolium salts, such as ($C_{10}$-$C_{25}$)alkylimidazolinium methyl sulfates, salts of substituted polyamines, such as N-tallow-N,N',N'-triethanol-1,3-propylenediamine dichloride or di(methyl sulfate) or N-tallow-N,N,N',N',N'-pentamethyl-1,3-propylenediamine dichloride.

Additional examples of appropriate surfactants are compounds generally used as surface-active agents denoted in the well-known handbooks "Surface Active Agents", volume I, by Schwartz and Perry, and "Surface Active Agents, and Detergents", volume II, by Schwartz, Perry and Berch.

The surface-active agents can represent from 0.005 to 60%, in particular from 0.5 to 40%, of the weight of the composition of the invention, this being according to the nature of the surface-active agent(s) and the destination of the cleaning composition.

Advantageously, the copolymer/surfactant(s) ratio by weight is between 1/1 and 1/1000, advantageously 1/2 and 1/200.

The preferably cleaning or rinsing composition according to the invention can additionally comprise at least one other additive chosen in particular from conventional additives present in compositions for cleaning or rinsing hard surfaces.

Mention may in particular be made of:

chelating agents, in particular of the water-soluble aminophosphonates and organic phosphonates type, such as
1-hydroxyethane-1,1-diphosphonates,
aminotri(methylenediphosphonate),
vinyldiphosphonates,
salts of oligomers or polymers of vinylphosphonic or vinyldiphosphonic acid,
salts of random co-oligomers or copolymers of vinylphosphonic or vinyldiphosphonic acid and of acrylic acid and/or of maleic anhydride and/or of vinylsulfonic acid and/or of acrylamidomethylpropanesulfonic acid,
salts of phosphonated polycarboxylic acids,
polyacrylates comprising phosphonate ending(s),
salts of cotelomers of vinylphosphonic or vinyldiphosphonic acid and of acrylic acid,
such as those of the Briquest® range or Mirapol A300 or 400 from Rhodia (in a proportion of 0 to 10%, preferably of 0 to 5%, of the total weight of cleaning composition);

sequestering or scale-inhibiting agents, such as
polycarboxylic acids or their water-soluble salts and water-soluble salts of carboxylic polymers or copolymers, such as
polycarboxylate or hydroxypolycarboxylate ethers,
polyacetic acids or their salts (nitriloacetic acid, N,N-dicarboxymethyl-2-aminopentanedioic acid, ethylenediaminetetraacetic acid, diethylenetriaminepentaacetic acid, ethylenediaminetetraacetates, nitriloacetates or N-(2-hydroxyethyl)nitrilodiacetates),
salts of ($C_5$-$C_{20}$ alkyl)succinic acids, polycarboxylic acetal esters,
salts of polyaspartic or polyglutamic acids,
citric acid, adipic acid, gluconic acid or tartaric acid, or their salts,
copolymers of acrylic acid and of maleic anhydride or acrylic acid homopolymers, such as Rhodoline DP 226 35 from Rhodia and Sokalan CP5 from BASF (in a proportion of 0 to 10% of the total weight of said cleaning composition),
sulfonated polyvinylstyrenes or their copolymers with acrylic acid, methacrylic acid, and the like,
(in a proportion of 0 to 10% of the total weight of cleaning composition);
 inorganic builders (detergency adjuvants which improve the surface properties of surfactants) of the type:
  alkali metal, ammonium or alkanolamine polyphosphates, such as Rhodiaphos HD7, sold by Rhodia (in a proportion of 0 to 70% of the total weight of cleaning composition),
  alkali metal pyrophosphates,
  alkali metal silicates with an $SiO_2/M_2O$ ratio which can range from 1 to 4, preferably from 1.5 to 3.5, very particularly from 1.7 to 2.8; they can be amorphous silicates or lamellar silicates, such as the α, β, γ and δ phases of $Na_2Si_2O_5$, sold under the references NaSKS-5, NaSKS-7, NaSKS-11 and NaSKS-6 by Clariant,
  alkali metal or alkaline earth metal borates, carbonates, bicarbonates or sesquicarbonates (in an amount which can range up to approximately 50% of the total weight of said cleaning composition),
  cogranules of alkali metal silicate hydrates, with an $SiO_2/M_2O$ ratio which can range from 1.5 to 3.5, and of alkali metal (sodium or potassium) carbonates; mention may in particular be made of the cogranules in which the content by weight of water associated with the silicate, with respect to the dry silicate, is at least 33/100, it being possible for the ratio by weight of the silicate to the carbonate to range from 5/95 to 45/55, preferably from 15/85 to 35/65, such as described in EP-A-488 868 and EP-A-561 656, for example Nabion 15, sold by Rhodia,
(it being possible for the total amount of builders to represent up to 90% of the total weight of said cleaning or rinsing composition);
 bleaching agents of the perborates or percarbonates type, which may or may not be combined with acetylated bleaching activators, such as N,N,N',N'-tetraacetylethylenediamine (TAED), or chlorinated products of the chloroisocyanurates type, or chlorinated products of the alkali metal hypochlorites type, or aqueous hydrogen peroxide solution (in a proportion of 0 to 30% of the total weight of said cleaning composition);
 fillers of the sodium sulfate, sodium chloride, sodium carbonate, calcium carbonate, kaolin or silica type, in a proportion of 0 to 50% of the total weight of said composition;
 bleaching catalysts comprising a transition metal, in particular iron, manganese and cobalt complexes, such as those of the type $[Mn^{IV}_2(\mu\text{-}O)_3(Me_3TACN)_2](PF_6)_2$, $[Fe^{II}(MeN_4py)(MeCN)](ClO_4)_2$, $[(Co^{III})(NH_3)_5(OAc)](OAc)_2$, described in U.S. Pat. Nos. 4,728,455, 5,114,606, 5,280,117, EP-A-909 809, U.S. Pat. No. 5,559,261, WO 96/23859, 96/23860 and 96/23861 (in a proportion of 0 to 5% of the total weight of said cleaning composition);
agents which influence the pH of the composition, which are soluble in the cleaning or rinsing medium, in particular
basifying additives (alkali metal phosphates, carbonates, perborates or alkali metal hydroxides) or
optionally cleaning acidifying additives, such as inorganic acids (phosphoric, polyphosphoric, sulfamic, hydrochloric, hydrofluoric, sulfuric, nitric or chromic acid), carboxylic or polycarboxylic acids (acetic, hydroxyacetic, adipic, citric, formic, fumaric, gluconic, glutaric, glycolic, malic, maleic, lactic, malonic, oxalic, succinic and tartaric acid), or salts of acids, such as sodium bisulfate or alkali metal bicarbonates and sesquicarbonates;
polymers used to control the viscosity of the mixture and/or the stability of the foams formed during use, such as cellulose derivatives or guar derivatives (carboxymethylcellulose, hydroxyethylcellulose, hydroxypropylguar, carboxymethylguar, carboxymethylhydroxypropylguar, and the like), xanthan gum, succinoglycan (Rheozan® sold by Rhodia), locust bean gum or carrageenans (in a proportion of 0 to 2% of the total weight of said cleaning composition);
hydrotropic agents, such as short-chain $C_2$-$C_8$ alcohols, in particular ethanol, diols and glycols, such as diethylene glycol or dipropylene glycol, sodium xylenesulfonate or sodium naphthalenesulfonate (in a proportion of 0 to 10 g per 100 g of said cleaning composition);
hydrating or moisturizing agents for the skin, such as glycerol or urea, or agents for protecting the skin, such as proteins or protein hydrolysates, vegetable oils, such as soybean oil, or cationic polymers, such as cationic guar derivatives (Jaguar C13S®, Jaguar C162® or Hicare 1000®, sold by Rhodia) (in a proportion of 0 to 40% of the total weight of said cleaning composition);
biocides or disinfectants, such as
cationic biocides, for example
mono(quaternary ammonium) salts, such as
cocoalkylbenzyldimethylammonium, ($C_{12}$-$C_{14}$ alkyl)benzyldimethylammonium, cocoalkyldichlorobenzyldimethylammonium, tetradecylbenzyldimethylammonium, didecyldimethylammonium or dioctyldimethylammonium chlorides,
myristyltrimethylammonium or cetyltrimethylammonium bromides,
monoquaternary heterocyclic amine salts, such as laurylpyridinium, cetylpyridinium or ($C_{12}$-$C_{14}$ alkyl)benzylimidazolium chlorides,
(fatty alkyl)triphenylphosphonium salts, such as myristyltriphenylphosphonium bromide,
polymeric biocides, such as those derived from the reaction
of epichlorohydrin and of dimethylamine or of diethylamine,
of epichlorohydrin and of imidazole,
of 1,3-dichloro-2-propanol and of dimethylamine,
of 1,3-dichloro-2-propanol and of 1,3-bis(dimethylamino)-2-propanol,
of ethylene dichloride and of 1,3-bis(dimethylamino)-2-propanol,
of bis(2-chloroethyl)ether and of N,N'-bis(dimethylaminopropyl)urea or -thiourea,
biguanidine polymer hydrochlorides, such as Vantocil IB, amphoteric biocides, such as N-[N'-($C_8$-$C_{18}$ alkyl)-3-aminopropyl]glycine, N-{N'-[N"-($C_8$-$C_{18}$ alkyl)-2-aminoethyl]-2-aminoethyl}glycine or N,N-bis[N'-($C_8$-$C_{18}$ alkyl)-2-aminoethyl]glycine derivatives, such as (dodecyl)(aminopropyl)glycine or (dodecyl)(diethylenediamine)glycine, amines, such as N-(3-aminopropyl)-N-dodecyl-1,3-propanediamine, halogenated biocides, such as iodophores and hypochlorite salts, such as sodium dichloroisocyanurate, phenolic biocides, such as phenol, resorcinol, cresols or salicylic acid, hydrophobic biocides, such as para-chloro-meta-xylenol or dichloro-meta-xylenol, 4-chloro-m-cresol, resorcinol monoacetate, mono- or polyalkyl or -aryl phenols, cresols or resorcinols, such as o-phenylphenol, p-(tert-butyl)phenol, or 6-(n-amyl)-m-cresol, alkyl and/or aryl chloro- or bromophenols, such as o-benzyl-p-chlorophenol, halogenated diphenyl ethers, such as 2',4,4'-trichloro-2-hydroxydiphenyl ether (triclosan) or 2,2'-dihydroxy-5,5'-dibromodiphenyl ether, chlorphenesin (p-chlorophenyl glyceryl ether), in a proportion of 0 to 5% of the total weight of said cleaning composition;

solvents having a good cleaning or degreasing activity, such as alkylbenzenes of octylbenzene type, olefins having a boiling point of at least 100° C., such as α-olefins, preferably 1-decene or 1-dodecene, glycol ethers of general formula $R1O(R2O)_mH$, where R1 is an alkyl group exhibiting from 3 to 8 carbons and each R2 is either an ethylene or propylene and m is a number which varies from 1 to 3; mention may be made of monopropylene glycol monopropyl ether, dipropylene glycol monobutyl ether, monopropylene glycol monobutyl ether, diethylene glycol monohexyl ether, monoethylene glycol monohexyl ether, monoethylene glycol monobutyl ether and their mixtures, diols exhibiting from 6 to 16 carbon atoms in their molecular structure; diols are particularly advantageous as, in addition to their degreasing properties, they can help in removing calcium salts (soaps); diols comprising from 8 to 12 carbon atoms are preferred, very particularly 2,2,4-trimethyl-1,3-pentanediol, other solvents, such as pine oil, orange terpenes, benzyl alcohol, n-hexanol, phthalic esters alcohols having 1 to 4 carbon atoms, butoxy propanol, Butyl Carbitol and 1-(2-(n-butoxy)-1-methylethoxy)propan-2-ol, also known as butoxypropoxy propanol or dipropylene glycol monobutyl ether, hexyl diglycol (Hexyl Carbitol), butyl triglycol, diols, such as 2,2,4-trimethyl-1,3-pentanediol, and their mixtures, (in a proportion of 0 to 30% of the total weight of said cleaning composition);

industrial cleaners, such as solutions of alkali metal salts of the phosphate, carbonate, silicate, and the like, type of sodium or potassium (in a proportion of 0 to 50% of the total weight of said cleaning composition);

water-soluble organic solvents with little cleaning effect, such as methanol, ethanol, isopropanol, ethylene glycol, propylene glycol and their mixtures (in a proportion of 0 to 40% of the total weight of said cleaning composition);

cosolvents, such as monoethanolamine and/or β-aminoalkanols, which are particularly advantageous in compositions with a pH of greater than 11, very particularly of greater than 11.7, as they help in reducing the formation of films and marks on hard surfaces (they can be employed in a proportion of 0.05 to 5% of the weight of the cleaning composition); solvent systems comprising monoethanolamine and/or β-aminoalkanols are described in U.S. Pat. No. 5,108,660;

antifoaming agents, such as soaps in particular. Soaps are alkali metal salts of fatty acids, in particular sodium, potassium, ammonium and alkanol-ammonium salts of higher fatty acids comprising approximately from 8 to 24 carbon atoms and preferably from approximately 10 to approximately 20 carbon atoms; mention may in particular be made of mono-, di- and triethanolamine, sodium and potassium salts of mixtures of fatty acids derived from coconut oil and from ground walnut oil. The amount of soap can be at least 0.005% by weight, preferably from 0.5 to 2% by weight, with respect to the total weight of the composition. Additional examples of foam modifiers are organic solvents, hydrophobic silica, silicone oil and hydrocarbons.

abrasives, such as silica or calcium carbonate;

various additives, such as enzymes, fragrances, colorants, agents which inhibit corrosion of metals, preservatives, optical brighteners, opacifying or pearlescent agents, and the like.

The pH of the composition forming the subject matter of the invention or the pH of use of said composition can range from 0.5 to 14, preferably from 1 to 14.

Compositions of alkaline type, with a pH of greater than or equal to 7.5, preferably of greater than 8.5, for domestic applications (very particularly with a pH from 8.5 to 12, in particular from 8.5 to 11.5) are of particular use for the removal of greasy soiling substances and are particularly well suited to the cleaning of kitchens.

They can comprise from 0.001 to 5%, preferably from 0.005 to 2%, of their weight of the copolymer of the invention.

The alkaline compositions generally comprise, in addition to the copolymer, at least one additive chosen from a sequestering or scale-inhibiting agent (in an amount ranging from 0 to 40%, preferably from 1 to 40%, more preferably from 2 to 30% and very particularly from 5 to 20%, of the weight of the composition), a cationic biocide or disinfectant, in particular of quaternary ammonium type, such as (N-alkyl)benzyldimethylammonium chloride, (N-alkyl)dimethyl(ethylbenzyl) ammonium chloride, N-didecyldimethylammonium halide and di(N-alkyl)dimethylammonium chloride (in an amount which can range from 0 to 60%, preferably from 0 to 40%, more preferably from 0 to 15% and very particularly from 0 to 5%, of the weight of the composition), at least one nonionic, amphoteric, zwitterionic or anionic surface-active agent or their mixture; when a cationic surface-active agent is present, said composition in addition preferably comprises an amphoteric and/or nonionic surface-active agent (the total amount of surface-active agents can range from 0 to 80%, preferably from 0 to 50%, very particularly from 0 to 35%, of the weight of the composition), if necessary, a pH modifier, in an amount which makes it possible to achieve, optionally after diluting or dissolving the composition, a pH of use ranging from 7.5 to 13; the pH modifier can in particular be a buffer system comprising monoethanolamine and/or a β-aminoalkanol and potentially but preferably "cobuffer" alkaline materials from the group consisting of aqueous ammonia, $C_2$-$C_4$ alkanolamines, silicates, borates, carbonates, bicarbonates, alkali metal hydroxides and their mixtures. The preferred cobuffers are alkali metal hydroxides.

from 0.5 to 98%, preferably from 25 to 95%, very particularly from 45 to 90%, by weight of water,
a cleaning or degreasing organic solvent, in an amount which can represent from 0 to 60%, preferably from 1 to 45%, very particularly from 2 to 15%, of the weight of said composition,
a cosolvent, such as monoethanolamine and/or β-aminoalkanols, in an amount which can represent from 0 to 10%, preferably from 0.05 to 10%, very particularly from 0.05 to 5%, by weight of said composition,
a water-soluble organic solvent with little cleaning effect, in an amount which can represent from 0 to 25%, preferably from 1 to 20%, very particularly from 2 to 15%, of the weight of said composition,
optionally a bleaching agent, a fragrance or other conventional additives.

Said alkaline compositions can be provided in the form of a ready-for-use formulation or else of a dry or concentrated formulation to be diluted in water in particular before use; they can be diluted from 1- to 10 000-fold, preferably from 1- to 1000-fold, before use.

Advantageously, a formulation for cleaning kitchens comprises:
from 0.001 to 1% by weight of the copolymer of the invention,
from 1 to 10% by weight of water-soluble solvent, in particular isopropanol,
from 1 to 5% by weight of cleaning or degreasing solvent, in particular butoxypropanol,
from 0.1 to 2% by weight of monoethanolamine,
from 0 to 5% by weight of at least one noncationic surface-active agent, preferably an amphoteric or nonionic surface-active agent,
from 0 to 1% by weight of at least one cationic surface-active agent with a disinfecting property (in particular mixture of (n-alkyl)dimethyl(ethylbenzyl)ammonium chloride and (n-alkyl)dimethylbenzylammonium chloride), the total amount of surface-active agent(s) representing from 1 to 50% by weight,
from 0 to 2% by weight of a dicarboxylic acid as scale-inhibiting agent,
from 0 to 5% of a bleaching agent,
and from 70 to 98% by weight of water.

The pH of such a formulation is preferably from 7.5 to 13, more preferably from 8 to 12.

Compositions of acidic type, with a pH of less than 5, are of particular use for the removal of soiling substances of inorganic type; they are particularly well suited to the cleaning of toilet bowls.

They can comprise from 0.001 to 5%, preferably from 0.01 to 2%, of their weight of the copolymer of the invention.

The acidic compositions generally comprise, in addition to the copolymer of the invention,
an inorganic or organic acidic agent (in an amount ranging from 0.1 to 40%, preferably from 0.5 to 20% and more preferably from 0.5 to 15%, of the weight of the composition),
at least one nonionic, amphoteric, zwitterionic or anionic surface-active agent or their mixture (the total amount of surface-active agents can range from 0.5 to 20%, preferably from 0.5 to 10%, of the weight of the composition),
optionally a cationic biocide or disinfectant, in particular of quaternary ammonium type such as (N-alkyl)benzyldimethylammonium chloride, (N-alkyl)dimethyl(ethylbenzyl)ammonium chloride, N-didecyldimethylammonium halide and di(N-alkyl)dimethylammonium chloride (in an amount which can range from 0.01 to 2%, preferably from 0.1 to 1%, of the weight of the composition),
optionally a thickening agent (in an amount ranging from 0.1 to 3% of the weight of the composition),
optionally a bleaching agent (in an amount ranging from 1 to 10% of the weight of the composition),
from 0.5 to 99%, preferably from 50 to 98%, by weight of water,
a solvent, such as glycol or an alcohol (in an amount which can range from 0 to 10%, preferably from 1 to 5%, of the weight of the composition),
optionally a fragrance, a preservative, an abrasive or other conventional additives.

Said acidic compositions are preferably provided in the form of a ready-for-use formulation.

Advantageously, a formulation for cleaning toilet bowls comprises:
from 0.05 to 5%, preferably from 0.01 to 2%, by weight of the copolymer of the invention,
an amount of acidic cleaning agent such that the final pH of the composition is from 0.5 to 4, preferably from 1 to 4; this amount is generally from 0.1 to approximately 40% and preferably between 0.5 and approximately 15% by weight, with respect to the weight of the composition; the acidic agent can be in particular an inorganic acid, such as phosphoric, sulfamic, hydrochloric, hydrofluoric, sulfuric, nitric or chromic acid and mixtures of these, an organic acid, in particular acetic, hydroxyacetic, adipic, citric, formic, fumaric, gluconic, glutaric, glycolic, malic, maleic, lactic, malonic, oxalic, succinic or tartaric acid and mixtures of these, or acid salts, such as sodium bisulfate, and mixtures of these; the preferred amount depends on the type of acidic cleaner used: for example, with sulfamic acid, it is between 0.2 and 10%, with hydrochloric acid between 1 and 15%, with citric acid between 2 and 15%, with formic acid between 5 and 15% and with phosphoric acid between 2 and 30%, by weight,
from 0.5 to 10% by weight of at least one surface-active agent, preferably an anionic or nonionic surface-active agent,
optionally from 0.1 to 2% by weight of at least one cationic surface-active agent with a disinfecting property (in particular mixture of (n-alkyl)dimethyl(ethylbenzyl)ammonium chloride and (n-alkyl)dimethylbenzylammonium chloride),
optionally a thickening agent (in an amount ranging from 0.1 to 3% of the weight of the composition) of gum type, in particular a xanthan gum or a succinoglycan (Rheozan),
optionally a bleaching agent (in an amount ranging from 1 to 10% of the weight of the composition),
optionally a preservative, a colorant, a fragrance or an abrasive,
and from 50 to 95% by weight of water.

A few other specific embodiments and forms of application of the composition of the invention are clarified below.

Thus, the composition according to the invention can be employed for making easier the cleaning treatment of glass surfaces, in particular of windows. This treatment can be carried out by the various known techniques. Mention may be made in particular of the techniques for cleaning windows by spraying with a jet of water using devices of the Kärcher® type.

The amount of copolymer of the invention introduced will generally be such that, during the use of the cleaning composition, after optional dilution, the concentration of copolymer of the invention is between 0.001 g/l and 2 g/l, preferably between 0.005 g/l and 0.5 g/l.

The composition for cleaning windows according to the invention comprises:
- from 0.001 to 10%, preferably 0.005 to 3%, by weight of the copolymer of the invention;
- from 0.005 to 20%, preferably from 0.5 to 10%, by weight of at least one nonionic surface-active agent (for example an amine oxide or an alkyl polyglucoside) and/or anionic surface-active agent; and
- the remainder being formed of water and/or of various additives which are conventional in the field.

The cleaning formulations for windows comprising said polymer can also comprise:
- from 0 to 10%, advantageously from 0.5 to 5%, of amphoteric surfactant,
- from 0 to 30%, advantageously from 0.5 to 15%, of solvent, such as alcohols, and
- the remainder being composed of water and of conventional additives (in particular fragrances).

The pH of the composition is advantageously between 6 and 11.

The composition of the invention is also advantageous for making easier the cleaning of dishes in an automatic device. Said composition can be either a detergent (cleaning) formulation used in the washing cycle or a rinsing formulation.

The detergent compositions for washing dishes in automatic dishwashers according to the invention advantageously comprise from 0.01 to 5%, preferably 0.1 to 3%, by weight of the copolymer of the invention.

Said detergent compositions for dishwashers also comprise at least one surface-active agent, preferably a nonionic surface-active agent, in an amount which can range from 0.2 to 10%, preferably from 0.5 to 5%, of the weight of said detergent composition, the remainder being composed of various additives and of fillers, as already mentioned above.

Thus, they can additionally comprise
- up to 90% by weight of at least one detergency adjuvant (builder) of sodium tripolyphosphate or silicate type,
- up to 10%, preferably from 1 to 10%, very particularly from 2 to 8%, by weight of at least one auxiliary cleaning agent, preferably a copolymer of acrylic acid and of methylpropanesulfonic acid (AMPS),
- up to 30% by weight of at least one bleaching agent, preferably perborate or percarbonate, which may or may not be combined with a bleaching activator,
- up to 50% by weight of at least one filler, preferably sodium sulfate or sodium chloride.

The pH is advantageously between 8 and 13.

The compositions for making easier the rinsing of dishes in automatic dishwashers according to the invention can advantageously comprise from 0.02 to 10%, preferably from 0.1 to 5%, by weight of the copolymer of the invention, with respect to the total weight of the composition.

Said compositions can also comprise from 0.1 to 20%, preferably 0.2 to 15%, by weight, with respect to the total weight of said composition, of a surface-active agent, preferably a nonionic surface-active agent.

Mention may be made, among preferred nonionic surface-active agents, of surface-active agents of the following types: polyoxyethylenated $C_6$-$C_{12}$ alkylphenols, polyoxyethylenated and/or polyoxypropylenated $C_8$-$C_{22}$ aliphatic alcohols, ethylene oxide/propylene oxide block copolymers, optionally polyoxyethylenated carboxamides, and the like.

Said compositions can additionally comprise from 0 to 10%, preferably from 0.5 to 5%, by weight, with respect to the total weight of the composition, of a calcium-sequestering organic acid, preferably citric acid.

They can also comprise an auxiliary agent of copolymer of acrylic acid and of maleic anhydride or acrylic acid homopolymers type, in a proportion of 0 to 15%, preferably 0.5 to 10%, by weight, with respect to the total weight of said composition.

The pH is advantageously between 4 and 7.

Another specific embodiment of the invention is a composition for making easier the exterior cleaning, in particular of the bodywork, of motorized vehicles (automobiles, trucks, buses, trains, planes, and the like).

In this case also, the composition can be a cleaning composition proper or a rinsing composition.

The cleaning composition for motor vehicles advantageously comprises from 0.005 to 10% by weight of the copolymer of the invention, with respect to the total weight of said composition, and:
- nonionic surface-active agents (in a proportion of 0 to 30%, preferably of 0.1 to 15%, of the formulation),
- amphoteric and/or zwitterionic surface-active agents (in a proportion of 0 to 30%, preferably of 0.01 to 10%, of the formulation),
- cationic surface-active agents (in a proportion of 0 to 30%, preferably of 0.05 to 15%, of the formulation),
- anionic surface-active agents (in a proportion of 0 to 30%, preferably of 0.1 to 15%, of the formulation),
- detergency adjuvants (builders) (in a proportion of 1 to 99%, preferably of 40 to 98%, of the formulation),
- hydrotropic agents,
- fillers, pH modifiers, and the like.

The minimum amount of surface-active agent present in this type of composition is preferably at least 0.5% of the formulation.

The pH of the composition is advantageously between 8 and 13.

The composition of the invention is also particularly suitable for making easier the cleaning of hard surfaces of ceramic type (tiling, bath tubs, bathroom sinks, and the like), in particular for bathrooms.

The cleaning formulation advantageously comprises from 0.02 to 5% by weight of the copolymer of the invention, with respect to the total weight of said composition, and at least one surface-active agent.

Preference is given, as surface-active agents, to nonionic surface-active agents, in particular the compounds produced by condensation of alkylene oxide groups of hydrophilic nature with a hydrophobic organic compound which can be of aliphatic or alkylaromatic nature.

The length of the hydrophilic chain or of the polyoxyalkylene radical condensed with any hydrophobic group can be readily adjusted in order to obtain a water-soluble compound having the desired degree of hydrophilic/hydrophobic balance (HLB).

The amount of nonionic surface-active agents in the composition of the invention can be from 0 to 30% by weight, preferably from 0 to 20% by weight.

An anionic surfactant can optionally be present in an amount of 0 to 30%, advantageously 0 to 20%, by weight.

It is also possible, but not essential, to add amphoteric, cationic or zwitterionic detergents.

The total amount of surface-active compounds employed in this type of composition is generally between 0.5 and 50%, preferably between 1 and 30%, by weight and more particularly between 2 and 20% by weight, with respect to the total weight of the composition.

Said cleaning composition can also comprise other minor ingredients, such as:
- detergency adjuvants (builders) as mentioned above (in an amount which can be between 0.1 and 25% by weight, with respect to the total weight of the composition),
- a foam modifier as mentioned above, in particular of soap type (in an amount generally of at least 0.005% by weight, preferably of 0.5% to 2% by weight, with respect to the total weight of the composition),
- pH modifiers, colorants, optical brighteners, agents for suspending soiling substances, detergent enzymes, compatible bleaching agents, agents for controlling gel formation, freezing-thawing stabilizers, bactericides, preservatives, solvents, fungicides, insect repellants, hydrotropic agents, fragrances and opacifying or pearlescent agents.

The pH of the composition is advantageously between 2 and 12.

The composition according to the invention is also suitable for making easier the rinsing of shower walls.

The aqueous compositions for rinsing shower walls comprise from 0.02% to 5% by weight, advantageously from 0.05 to 1%, of the copolymer of the invention.

The other main active components of the aqueous compositions for rinsing showers of the present invention are at least one surface-active agent, present in an amount ranging from 0.5 to 5% by weight, and optionally a metal-chelating agent as mentioned above, present in an amount ranging from 0.01 to 5% by weight.

The aqueous compositions for rinsing showers advantageously comprise water with, optionally, a major proportion of at least one lower alcohol and a minor proportion of additives (between approximately 0.1 and approximately 5% by weight, more advantageously between approximately 0.5% and approximately 3% by weight and more preferably still between approximately 1% and approximately 2% by weight).

Some surface-active agents which can be used in this type of application are described in patents U.S. Pat. Nos. 5,536,452 and 5,587,022.

Preferred surfactants are polyethoxylated fatty esters, for example polyethoxylated sorbitan monooleates and polyethoxylated castor oil. Specific examples of such surface-active agents are the condensation products of 20 mol of ethylene oxide and of sorbitan monooleate (sold by Rhodia Inc. under the name Alkamuls PSMO-20® with an HLB of 15.0) and of 30 or 40 mol of ethylene oxide and of castor oil (sold by Rhodia Inc. under the names Alkamuls EL-620® (HLB of 12.0) and EL-719® (HLB of 13.6) respectively). The degree of ethoxylation is preferably sufficient to obtain a surfactant with an HLB of greater than 13.

The pH of the composition is advantageously between 7 and 11.

The composition according to the invention can also be employed for making easier the cleaning of glass-ceramic sheets.

Advantageously, the formulations for cleaning glass-ceramic sheets of the invention comprise:
- 0.01 to 5% by weight of the copolymer of the invention,
- 0.1 to 1% by weight of a thickener, such as a xanthan gum,
- 10 to 60% by weight of an abrasive agent, such as calcium carbonate or silica;
- 0 to 7% by weight of a solvent, such as butyl diglycol,
- 1 to 10% by weight of a nonionic surface-active agent, and optionally basifying agents or sequestering agents.

The pH of the composition is advantageously between 7 and 12.

As mentioned above, the composition according to the invention can also be employed in the field of industrial cleaning, in particular for making easier the cleaning of reactors.

Advantageously, said compositions comprise:
- from 0.02 to 5% by weight of the copolymer of the invention,
- from 1 to 50% by weight of alkali metal salts (sodium or potassium phosphates, carbonates, silicates),
- from 1 to 30% by weight of a mixture of surface-active agents, in particular of nonionic surface-active agents, such as ethoxylated fatty alcohols, and anionic surface-active agents, such as laurylbenzenesulfonate,
- from 0 to 30% by weight of a solvent, such as diisobutyl ether.

The pH of such a composition is generally from 8 to 14.

Composition for Cleaning Dishes

The composition of the invention can in particular be a composition for cleaning dishes, automatically or by hand. Such compositions are known. The compositions can in particular comprise at least one surfactant. The compositions for cleaning dishes automatically generally comprise, in addition, a builder.

The composition for cleaning dishes can in particular comprise from 0.01 to 5% by weight, preferably from 0.05 to 3% by weight, preferably from 0.2 to 1.5% by weight, of the copolymer of the invention.

The composition for cleaning dishes can be provided in any form, in particular in the aqueous or nonaqueous liquid form, which is preferably concentrated, in the solid form or in the gel form.

The composition for cleaning dishes can be capable of foaming in an aqueous medium. It preferably comprises at least one surface-active agent. Surface-active agents which can be used have been mentioned above. The surface-active agent can in particular be chosen from anionic surface-active agents, nonionic surface-active agents, amphoteric or zwitterionic surface-active agents, cationic surface-active agents or their mixtures.

The amount of surface-active agent, expressed on a dry basis, can represent from 0.1 to 99%, preferably from 0.5 to 60%, of the total weight of composition.

When the composition for cleaning dishes is a solid of cake of soap type, the amount of surface-active agent, expressed on a dry basis, can represent up to 99%, preferably up to 95%, of the total weight of composition; this amount usually represents at least 50% of the total weight of composition. The solids of cake of soap type can additionally comprise water and/or a water-compatible solvent in an amount which can range up to 20% of the weight of said solid.

Total weight of composition is understood to mean the weight of the whole of the composition including, in addition to the copolymer of the invention and optionally the surface-active agent (S), the other possible constituents (water, solvents, other additives).

The compositions for cleaning dishes by hand can additionally comprise additives for modifying the foam, in particular agents which improve the feel, the density and/or the whiteness of the foam, agents which increase the lifetime of the foam and/or agents which increase the amount of foam. In some cases, the term foam enhancers or foam boosters is used. They can, for example, be aliphatic alcohols (AA), preferably linear aliphatic alcohols, for example $C_8$-$C_{22}$, preferably $C_{12}$-$C_{18}$, more particularly $C_{12}$-$C_{16}$, alcohols, or their mixtures, which are described in the document WO 2006/035154. They can also be (co)polymers, for example described in the documents WO 00/71651, WO 00/71591, WO 02/026844, U.S. Pat. No. 6,656,900, EP 1 180 061, WO 99/27058, WO 99/27054, WO 99/27053, WO 99/27057, WO 00/71660, WO 00/71659, WO 00/71241, WO 00/71652 and WO 00/71658.

Preferably, the composition for cleaning dishes additionally comprises water and/or at least one water-compatible solvent. Water-compatible solvent is understood to mean any solvent which, as a mixture with water, forms, at ambient temperature, a single transparent phase. The water and/or the solvent can represent up to 99.5% of the total weight of said composition; the minimum amount of water and/or water-compatible solvent is usually 1%. When a water/solvent mixture is concerned, said solvent can represent up to 80% of the weight of said mixture. Said solvent is preferably chosen from aliphatic $C_2$-$C_8$ mono- or polyalcohols, and their ethers. Mention may in particular be made, as examples of solvents, of ethanol, propanol, isopropanol, butanol, 2-butoxyethanol, diethylene glycol, 1-butoxyethanol-2-propanol or diethylene glycol monobutyl ether.

Said composition for cleaning dishes, in particular when it is a concentrated liquid composition, can additionally comprise at least one polymer for controlling the viscosity and/or the stability of the foams, such as polyacrylic acids or their water-soluble salts exhibiting a weight-average molecular weight of 1000 to 5 000 000 g/mol, ethylene oxide/propylene oxide block copolymers with a weight-average molecular weight of up to 30 000 g/mol, polyethylene glycols having a molecular weight of at least 400 g/mol or biopolymers having a molecular weight of at least 10 000 g/mol; when it is present, said polymer can represent from 0.01 to 10% of the weight, on a dry basis, of the concentrated liquid composition.

Concentrated composition is understood to mean any composition capable of being diluted during use.

Mention may be made, as examples of polymers capable of controlling the viscosity and/or the stability of the foams, of:
  polyacrylic acids or their salts, such as the Carbopol products from B.F. Goodrich, in particular Carbopol 941, Carbopol 801, Carbopol 907, Carbopol 910, Carbopol 934 or Carbopol 940,
  ethylene oxide/propylene oxide block copolymers, such as the Antarox products from Rhodia, in particular Antarox F-88,
  biopolymers, such as guar gum, gum arabic, xanthan gum, rheozan gum, welan gum, carrageenans, or cellulose derivatives or guar derivatives (carboxymethylcellulose, hydroxyethylcellulose, hydroxypropylguar, carboxymethylguar or carboxymethylhydroxypropylguar).

Whitening agents, builders, hydrotropic agents, moisturizing agents, fragrances, biocides, preservatives and other normal additives can also be present, according to the destination of the composition.

Mention may in particular be made, as regards the compositions for washing dishes by hand, of:
  synthetic cationic polymers, such as Mirapol A550® or Mirapol A15®, sold by Rhodia, or Merquat 550®, sold by Calgon,
  hydrotropic agents, such as short $C_2$-$C_8$ alcohols, in particular ethanol, diols and glycols, such as diethylene glycol or dipropylene glycol,
  moisturizing or humectant agents for the skin, such as glycerol, urea or skin-protecting agents, such as proteins or protein hydrolysates, or cationic polymers, such as cationic guar derivatives (Jaguar C13S®, Jaguar C162® or Hicare 1000®, sold by Rhodia).

It is noted that the compositions can be diluted at the time of their use; the latter can be diluted from 10 to 50 000 times their volume, according to their destination. Their concentration of surface-active agents, after dilution, can generally reach from 0.0001 to 10%, preferably from 0.001 to 5%, very particularly from 0.005 to 2%.

Use of the Composition for Cleaning Dishes—Drying

The composition for cleaning dishes can be used normally.

In the context of a process for cleaning dishes by hand, a process comprising the following stages can, for example, be carried out:

Stage a) optionally diluting the composition in water,
Stage b) bringing together the dishes item to be cleaned and the optionally diluted composition, if appropriate using an application means,
Stage c) generally rubbing the dishes using a rubbing means,
Stage d) optionally rinsing the dishes,
Stage e) drying.

The process for cleaning dishes can vary according to the individual.

Stage a) can correspond to the formation of a dishes bath. The degree of dilution can typically be from 100 to 2000. A "full sink" process is sometimes referred to. In such an embodiment, the concentration of copolymer of the invention can in particular be from 0.00025 to 0.01%, preferably from 0.0001 to 0.005%. The degree of dilution can be adapted to this end. In particular, it can be stipulated by any communication means related to the product, for example on the label, in an advertisement, via a customer service department or via an internet site. A degree of diluting can be carried out during the application of the composition to an appropriate application and/or rubbing means comprising water, such as a sponge impregnated with water or with an aqueous composition or a nonwoven pad. In such an embodiment, the concentration of copolymer of the invention (after diluting) can in particular be from 1 to 100.

Stage b) can in particular be carried out by dipping the dishes item in a dishes bath. According to another form, the composition is applied directly to the dishes item, for example by pressure on a flexible or semi-flexible container comprising the composition, or using a pump, or by simple gravity. According to another form, the composition is applied to an application means, such as a sponge, a pad, a brush or the fingers of the person doing the dishes, optionally protected by gloves, and then the application means is brought into contact with the dishes item. For both these latter forms, a direct application process is often referred to. It is noted that a degree of diluting can then occur, stage a) and stage b) then being simultaneous and/or joined together.

The process of direct application type may be preferred and may provide a more significant improvement in the drying. In particular, it can be stipulated by any communication means related to the product, for example on the label, in an advertisement, via a customer service department or via an internet site.

Stage c) of rubbing can in particular be carried out conventionally, by circular movements and/or to-and-fro movements of the rubbing means over the dishes item. The rubbing means can, for example, be a sponge, a pad, a brush or the fingers of the person doing the dishes, optionally protected by gloves. It can in addition be the application means of stage b). The contacting operation can be carried out while rubbing; stage b) and stage c) are then joined together.

Stage d) is generally recommended. It can be carried out conventionally, for example by dipping in clean water (the dishes item is subsequently taken out) or by passing under a flow of water.

Stage e) can be carried out conventionally. During this stage, the dishes will simply be left to dry, if appropriate on a drain board, or a dish towel or any other device promoting the removal and/or absorption of water.

Other details or advantages of the invention may become apparent in the light of the examples which follow, without a limiting nature.

EXAMPLE 1

Preparation of a VP/DADMAC 90 mol %/10 mol % Copolymer 233 g of water are added to a 1 liter jacketed glass reactor equipped with a mechanical stirrer, a reflux condenser and temperature regulation by an automatically-controlled heating/cooling system. The temperature of the reaction medium is brought to 75° C. while flushing with nitrogen. 76 mg of 2,2'-azobis(2-methylpropionamidine)dihydrochloride are then added at 75° C., followed simultaneously by 38.5 g of 65% DADMAC in water over 3 h, 310 g of 50% N-vinylpyrrolidone in water over 4 h and 0.68 g of 2,2'-azobis(2-methylpropionamidine)dihydrochloride in 20 g of water over 5 h. At the end of the additions, the temperature is lowered to 65° C. 1.26 g of 25% 2,2'-azobis(2-methylpropionamidine)dihydrochloride in water are added at 65° C. The temperature is maintained at 65° C. for 5 h. The reaction medium is subsequently cooled to ambient temperature.

EXAMPLE 2

Use of the Copolymer in a Liquid for Dishes by Hand and Evaluation of the Rate of Drying Evaluation Protocol Objective: to estimate the quality of drying of a kitchen glass which is taken out of a basin of rinsing water.

Principle: a kitchen glass is washed by hand using the formulation to be evaluated, rinsed and dipped in a basin of water at 40° C. With the aim of facilitating the visualization of the residual traces of water after complete drying of the glass, this dipping is carried out in water of very high hardness. For convenience, use is made of commercial Contrex® mineral water.

The glass, laden with water on removing from the basin, is deposited on a support placed on a balance.

The weight of the glass is recorded while the water flows out, in order to obtain the weight of water remaining on the glass as a function of the time and thus the drying profile of said glass.

Device: a metal rod-support (2), the top end of which is slightly beveled, is placed on the balance (4).

A large funnel (3), inverted, covers the balance without touching the plate. The rod passes through the tube of the funnel.

The kitchen glass (1) will be hung upside-down on the end of the rod-support.

The only point of contact is on the bottom of the glass, inside. As the end is beveled, the glass tilts, so as to facilitate the flow of the water at one point. The water flows onto the funnel. The balance measures the loss in weight of the glass.

The acquisition of the measurements takes place automatically (connection of the balance to a computer via an RS232 port) via a Microsoft® Excel routine. Generally, one reading is taken per second, over a period of approximately 200 seconds.

Figure 2:
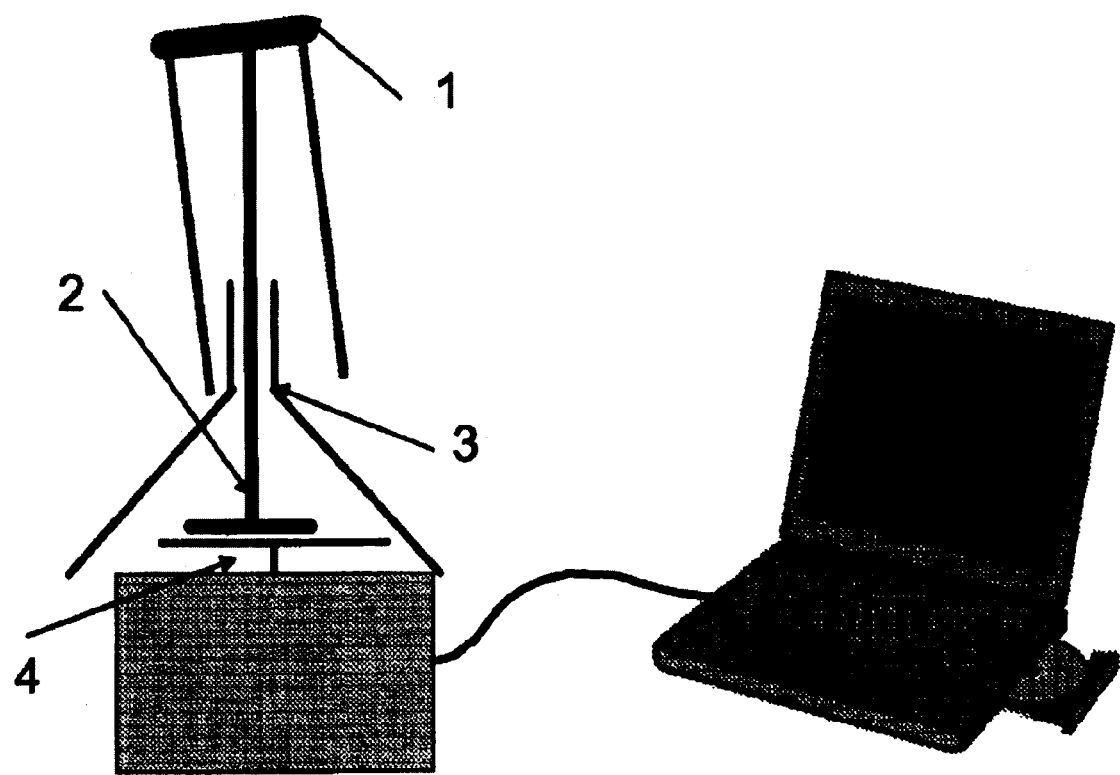
FIG. 2 depicts a device for weighing water present on a glass. The device contains a metal rod-support (2), the top end of which is slightly beveled, placed on top of a balance (4). The rod (2) passes through the tube of a large inverted funnel (3), which covers the balance without touching the plate. The glass (1) is hung upside-down on the end of the rod-support.

A diagram of the device is presented in FIG. 2.

Procedure:

Put on the laboratory gloves.
Take a clean glass.
Tare the balance.
Place the glass on the rod-support.
Determine its weight: "dry glass".
Put 3 liters of Contrex® water to be heated in a thermostatically controlled bath (40° C.).
Cut off a piece of sponge (sides of approximately 4 cm).
Run the faucet water at 40° C.
Wet the sponge and then wring it out.
Deposit the formulation to be evaluated on top of it (1 ml).
Squeeze the sponge several times in the hand in order to bring about copious foaming.
Rub the glass over all the faces with the sponge full of foam.
Rinse with hot water (40° C.). Thoroughly rinse the gloves.
Immerse in Contrex® water at 40° C.
Tare the balance.
Start the acquisition and simultaneously take the glass out of the thermostatically controlled bath in order to place it on the rod.
The sides of the glass must not touch the funnel in order not to falsify the weighing.
At 180 seconds:
Stop the acquisition.
Wipe off the water on the bottom and the sides of the glass.
Tare the balance without the glass.
Measure the "final weight" of the glass.

Exploitation of the Results:

The weight of the dry glass and the weight of water wiped off (weight at 180 s—final weight) have to be subtracted from the measurements of weights recorded. This is because the water remaining on the top of the glass has not had the opportunity to flow out due to this surface being virtually horizontal, and the water remaining on the lower side of the glass would have flowed out if the glass had been laid down flat on a surface normally used (drain board, dish towel, and the like). The amount of residual water on the vertical walls of the glass is thus evaluated.

A curve of the loss of water as a function of the time is obtained.

EXAMPLE 2.1 (COMPARATIVE)

Washing the Glass with a Commercial Formulation: Palmolive®

A drinking glass is washed according to the protocol described above with a commercial dishwashing formulation: Palmolive®, sold in France by Colgate-Palmolive.

It is found visually during the experiment that the glass remains covered for more than 150 seconds with a homogeneous film of water which only appears to disappear with the evaporation of the residual water.

The weight of water remaining on the glass is read as a function of the time according to the above protocol.

The following drying profile is obtained:

| Time (s) | Weight (g) |
| --- | --- |
| 10 | 1.517 |
| 20 | 0.957 |
| 30 | 0.799 |
| 40 | 0.616 |

-continued

| Time (s) | Weight (g) |
|---|---|
| 50 | 0.564 |
| 60 | 0.514 |
| 70 | 0.482 |
| 80 | 0.445 |
| 90 | 0.429 |
| 100 | 0.409 |
| 110 | 0.393 |
| 120 | 0.387 |
| 130 | 0.375 |
| 140 | 0.24 |
| 150 | 0.232 |
| 160 | 0.229 |
| 170 | 0.218 |

It is found that, after 170 seconds, 0.218 g of water remains on the glass. This water is distributed over the surface in a fairly homogeneous way, in the form of a very thin film.

After complete drying of the glass by evaporation of the residual water, the presence of a film of limescale covering a large part of the surface is found by observing this glass through a direct light (sunlight or light of a lamp). This deposit originates from the evaporation of the Contrex® water, which water has a hardness in the vicinity of 156 French TH degrees.

EXAMPLE 2.2

Washing the Glass with a Formulation Comprising the Copolymer of the Invention

A liquid formulation for dishes is prepared in the following way:

0.5 g (as weight of dry polymer) of the copolymer of example 1 is added to 100 g of the commercial formulation Palmolive®.

The experiment carried out in example 2.1 is then repeated and the following drying profile is obtained:

| Time (s) | Weight (g) |
|---|---|
| 10 | 1.5355 |
| 20 | 0.859 |
| 30 | 0.52 |
| 40 | 0.1875 |
| 50 | 0.055 |
| 60 | 0.047 |
| 70 | 0.0405 |
| 80 | 0.036 |
| 90 | 0.031 |
| 100 | 0.03 |
| 110 | 0.0255 |
| 120 | 0.0225 |
| 130 | 0.0205 |
| 140 | 0.0185 |
| 150 | 0.015 |
| 160 | 0.0125 |
| 170 | 0.011 |

It is found that, after an initial phase of approximately 20 s during which the weights of residual water on the glasses are comparable, with and without polymer, the weight of water remaining on the glass modified by the copolymer becomes significantly lower than on the unmodified glass. Progressive and homogeneous dewetting of the film of water on the surface of the glass is observed. This process begins via the top of the glass and goes down in order finally to spread slowly towards the bottom of the glass, without leaving a significant number of drops on the surface.

After 40 seconds, a glass washed with the formulation comprising the polymer already carries less residual water than is carried by the glass washed without polymer (example 2.1) at the end of the experiment, after 170 seconds.

At the end of the experiment, the water remaining on the glass washed in the presence of a polymer represents a wholly negligible amount, 11 mg. This glass is thus virtually dry. After complete drying of the glass, a noteworthy transparency and the absence of limescale film, with the exception of a few residual spots, are found by observing this glass through a direct light (sunlight or light of a lamp).

FIG. 1 exhibits a photograph with:
  on the left, a glass obtained after washing and drying according to example 2.1 (comparative)
  on the right, a glass obtained after washing and drying according to example 2.2 in accordance with the invention.

It is seen that the left-hand photograph (comparative) exhibits numerous highly visible marks of drying superimposed on a white film, in contrast to the right-hand photograph.

EXAMPLE 3

Use of the Copolymer in a Detergent for Cleaning Laundry and Evaluation of the Resistance to Transfer of the Colors A load of laundry comprising dye-donating fabrics and dye-accepting fabrics is washed with a reference detergent (detergent 1, comparative) and with a detergent according to the invention.

Detergent 1: Commercial detergent in France in 2008, Xtra Fraicheur muguet

Detergent 2: Detergent 1, to which 1% by weight of active material of the copolymer of example 1 is added.

Washing device: Launderometer—500 ml stainless steel containers

Washing conditions: Water 100 ml, hardness 20±2° F., temperature 60° C.

Dye-donating fabrics
  Direct Black 22 on cotton
  Direct Orange 39 on cotton
  Direct Red 83.1 on cotton
  Acid Blue 113 on polyamide Dye-accepting fabrics: 4 cm×12 cm sample of standardized fabrics made of cotton or of polyamide Progression of the tests
  The water+detergent solutions (100 ml of water+8.3 g/l detergent) are preheated to 40° C. A dye donor (0.3 g) and a dye acceptor are placed in each container, without addition of steel balls. The preheated solution (100 ml) is added. The device is set under way. Washing is carried out for 20 minutes after reaching the temperature of 60° C. The samples are then rinsed and dried on a line at ambient temperature.

Evaluations: the colorimetric differences (CIELAB system) are measured according to standard NFx08-014 using the Elrepho 3000 photocolorimeter from Datacolor. The colorimetric differences are translated into gradings according to the gray scale.

Results

|  |  | Detergent 1 (comparative) | Detergent 2 |
|---|---|---|---|
| Without UV irradiation |  |  |  |
| Cotton acceptor | Direct Black 22 | 11.9 | 7.3 |
|  | Direct Orange 39 | 32.2 | 26.5 |
|  | Direct Red 83.1 | 17.7 | 12.5 |
| Polyamide acceptor | Acid Blue 113 | 21.3 | 16.8 |
|  | Mean | 20.8 | 15.8 |
| With UV irradiation |  |  |  |
| Cotton acceptor | Direct Black 22 | 13.9 | 10.6 |
|  | Direct Orange 39 | 31.4 | 25.3 |
|  | Direct Red 83.1 | 23.1 | 18.6 |
| Polyamide acceptor | Acid Blue 113 | 24.4 | 20.5 |
|  | Mean | 23.2 | 18.7 |

The colorimetric differences (representative of the transfer of dye) are lower with detergent 2. This shows that the copolymer has an effect in preventing the transfer of colors.

What is claimed is:

1. A composition comprising a copolymer comprising from 1 to 25 mol % of cationic units A and from 75 to 99 mol % of other units B, wherein:
the units A comprise:
at least one inium group or,
at least one quaternary ammonium group chosen from:
trimethylammoniopropyl methacrylate chloride;
trimethylammonioethylacrylamide or -methacrylamide chloride or bromide;
trimethylammoniobutylacrylamide or -methylacrylamide methyl sulfate;
trimethylammoniopropylmethacrylamide methyl sulfate (MAPTA MeS);
(3-acrylamidopropyl)trimethylammonium chloride (APTAC);
methacryloyloxyethyltrimethylammonium chloride or methyl sulfate;
acryloyloxyethyltrimethylammonium salts (ADAMQUAT);
1-ethyl-2-vinylpyridinium or 1-ethyl-4-vinylpyridinium bromide, chloride or methyl sulfate;
N,N-dimethyldiallylammonium chloride (DADMAC);
N-(3-chloro-2-hydroxypropyl)trimethylammonium chloride (DIQUAT);
the monomer of formula:

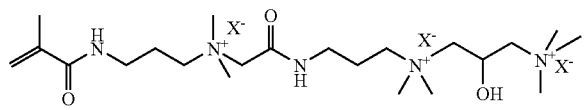

wherein X⁻ is an anion;
1-ethyl-2-vinylpyridinium or 1-ethyl-4-vinylpyridinium bromide, chloride or methyl sulfate; or
mixtures or combinations thereof;
the units B comprise units deriving from a vinyllactam;
said composition is adapted for treatment and/or modification of a textile or a hard surface; and
said copolymer is substantially devoid of hydrophobic non-ionic units.

2. The composition of claim 1, wherein the copolymer comprises a linear random copolymer.

3. The composition of claim 1, wherein the units A and B are present in an amount ranging from 1 to 100 mol % of the units of the copolymer.

4. The composition of claim 1, wherein the copolymer comprises:
from 3 to 13 mol % of units A, and
from 87 to 97 mol % of units B.

5. The composition of claim 1, wherein the molar ratio of the units A to the units B ranges from 1/99 to 25/75.

6. The composition of claim 1, wherein the copolymer additionally comprises:
hydrophilic nonionic units,
anionic or potentially anionic units,
cationic or potentially cationic units which are different from the units A, and/or
zwitterionic units.

7. The composition of claim 1, wherein:
the copolymer is substantially devoid of zwitterionic units, and
the copolymer is substantially devoid of anionic or potentially anionic units.

8. The composition of claim 1, wherein the vinyllactam is vinylpyrrolidone.

9. The composition of claim 1, wherein the units A derive from N,N-dimethyldiallylammonium chloride (DADMAC) and the units B derive from vinylpyrrolidone.

10. The composition of claim 1, further comprising at least one surfactant.

11. The composition of claim 1, further comprising at least one liquid vector.

12. A method for treating and/or modifying a textile or a hard surface with a composition according to claim 1.

13. The method of claim 12, wherein said composition further comprises a surfactant and/or a vector.

14. The method of claim 12, wherein the copolymer promotes slow dewetting, and/or rapid and/or mark-free drying of said surface.

15. A method comprising cleaning or rinsing laundry, or cleaning or rinsing dishes automatically or by hand with the composition of claim 1.

16. A method comprising protecting the color of laundry and/or preventing the transfer of colors with the composition of claim 1.

17. The composition of claim 1, wherein the copolymer consists essentially of cationic units A and other units B.

18. The composition of claim 1, wherein said copolymer consists of cationic units A and other units B, wherein the units A derive from N,N-dimethyldiallylammonium chloride (DADMAC) and the units B derive from vinylpyrrolidone.

19. The composition of claim 1, wherein said copolymer comprises from 1 to 25 mol % of units A deriving from N,N-dimethyldiallylammonium chloride (DADMAC) and from 75 to 99 mol % of units B deriving from vinylpyrrolidone.

20. The composition of claim 1, wherein said copolymer comprises from 3 to 13 mol % of units A deriving from N,N-dimethyldiallylammonium chloride (DADMAC) and from 87 to 97 mol % of units B deriving from vinylpyrrolidone.

21. The composition of claim 1, wherein said copolymer comprises 10 mol % of units A deriving from N,N-dimethyldiallylammonium chloride (DADMAC) and 90 mol % of units B deriving from vinylpyrrolidone.

22. The composition of claim 1, wherein said copolymer is also substantially devoid of cationic or potentially cationic units that are different from said units A, and/or zwitterionic units comprising a sulfobetaine group, and/or hydrophilic non-ionic units chosen from:

alkoxylated units of following formula:

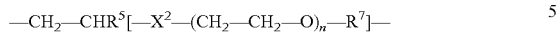

in which:
- $R^5$ is a hydrogen atom or a methyl group,
- $X^2$ is a group of formula —CO—O—, —CO—NH— or —$C_6H_4$—$CH_2$—,
- N is a whole or mean number greater than or equal to 1,
- $R^7$ is a hydrogen atom, an alkyl group or a tristyrylphenyl group, and/or hydroxylated units of following formula:

in which:
- $R^6$ is a hydrogen atom or a methyl group,
- $X^2$ is a group of formula —O—CO—O—, —CO—NH— or —$C_6H_4$—$CH_2$—, and
- $R^8$ is a hydrocarbon group having at least two carbon atoms which comprises at least two —OH groups, preferably on two consecutive carbon atoms, hydroxyalkyl acrylate or methacrylate units, or hydrophobic units.

23. The composition of claim 1, wherein said copolymer is substantially devoid of zwitterionic units.

\* \* \* \* \*